US012715891B2

(12) United States Patent
Cavallotti

(10) Patent No.: US 12,715,891 B2
(45) Date of Patent: Aug. 25, 2026

(54) IRON COMPLEXES AND SALTS THEREOF AS CONTRAST AGENTS FOR MRI

(71) Applicant: BRACCO IMAGING S.P.A., Milan (IT)

(72) Inventor: Camilla Cavallotti, Novara (IT)

(73) Assignee: BRACCO IMAGING S.P.A., Milan (IT)

(*) Notice: Subject to any disclaimer, the term of this patent is extended or adjusted under 35 U.S.C. 154(b) by 922 days.

(21) Appl. No.: 17/793,459

(22) PCT Filed: Jan. 19, 2021

(86) PCT No.: PCT/IB2021/050380

§ 371 (c)(1), (2) Date: Jul. 18, 2022

(87) PCT Pub. No.: WO2021/148939

PCT Pub. Date: Jul. 29, 2021

(65) Prior Publication Data

US 2023/0078638 A1 Mar. 16, 2023

(30) Foreign Application Priority Data

Jan. 20, 2020 (IT) ........................ 102020000000922

(51) Int. Cl.
*C07F 15/02* (2006.01)

(52) U.S. Cl.
CPC .................................. *C07F 15/025* (2013.01)

(58) Field of Classification Search
CPC ..................................................... C07F 15/025
See application file for complete search history.

(56) References Cited

U.S. PATENT DOCUMENTS 4,758,422 A * 7/1988 Quay ..................... A61K 49/00 424/9

FOREIGN PATENT DOCUMENTS

EP 0914118 B1 10/2002

OTHER PUBLICATIONS

Pharmazie 2011, 66, 916-919 (Jasprica et al.) (Year: 2011).*
Radiol. 2018, 286, 537-546 (Boehm-Sturm et al.) (Year: 2018).*
Drug Metab. Dispos. 2008, 36, 2523-2538 (Bruin et al.) (Year: 2008).*
Dorazio, S. et al, "Iron(II) PARACEST MRI Contrast Agents," Journal of the American Chemical Society, 133:14154-14156 (2011).

(Continued)

*Primary Examiner* — Amy C Bonaparte
*Assistant Examiner* — Derek Rhoades
(74) *Attorney, Agent, or Firm* — VIVICAR Law, PLLC

(57) ABSTRACT

The present invention relates to an iron complex having the general formula (I) or a pharmaceutically acceptable salt thereof. The present invention also relates to a pharmaceutical composition formulated for oral and/or parenteral administration, preferably intravenous, said pharmaceutical composition preferably being formulated as an aqueous solution comprising said complex or salt. The present invention further relates to said complex or a salt thereof or said pharmaceutical composition for use as a contrast agent for magnetic resonance imaging (MRI), as well as a method and a kit for in situ preparation of said complex or salt and said pharmaceutical composition.

20 Claims, 8 Drawing Sheets

(56) References Cited

OTHER PUBLICATIONS

Heinz, U. et al, "4-[3,5-Bis(2-hydroxyphenyl)-1,2,4-triazol-1-yl]-benzoic Acid: A Novel Efficient and Selective Iron(iii) Complexing Agent," Angew. Chem. Int. Ed., 38:2568-2570 (1999).
International Search Report and Written Opinion for PCT/IB2021/050380, mailed Apr. 7, 2021.
Lee, M. et al, "Biocompatible and Biodegradable Fe3+-Melanoidin Chelate as a Potentially Safe Contrast Agent for Liver MRI," Bioconjugate Chemistry, 29:2426-2435 (2018).
Merkofer, M. et al, "Redox properties of iron complexes of orally active iron chelators CP20, CP502, CP509, and ICL670," Helvetica Chimica Acta , 87:3021-3034 (2004).
Steinhauser, S. et al, "Complex Formation of ICL670 and Related Ligands with FeIll and FeIl," European Journal of Inorganic Chemistry, 21:4177-4192 (2004).
Worah, D. et al, "Ferrioxamine as a magnetic resonance contrast agent: preclinical studies and phase I and II human clinical trials," Invest. Radiol., 23(Suppl):S281-S285 (1988).
Kuźnik, N., et al., "Iron(III) Contrast Agent Candidates for MRI: a Survey of the Structure-Effect Relationship in the Last 15 Years of Studies." Eur. J. Inorg. Chem., 445-458 (2016).

* cited by examiner

IRON COMPLEXES AND SALTS THEREOF AS CONTRAST AGENTS FOR MRI

CROSS-REFERENCE TO RELATED APPLICATIONS

This application is the national stage application of corresponding international application number PCT/IB2021/050380, filed Jan. 19, 2021, which claims priority to and the benefit of Italian application no. 102020000000922, filed Jan. 20, 2020, which is hereby incorporated by reference in its entirety.

TECHNICAL FIELD

The present invention fits into the field of contrast agents for magnetic resonance imaging (MRI) and relates to an iron complex having the general formula (I) or a pharmaceutically acceptable salt thereof and a pharmaceutical composition comprising said complex or salt. The present invention further relates to a method and a kit for in situ preparation of said complex or salt and said pharmaceutical composition.

PRIOR ART

In recent decades, magnetic resonance imaging (MRI) has gained a role of primary importance among diagnostic techniques, as it enables images characterised by an extremely high spatial and temporal resolution to be obtained. An MRI image is the topological representation of the signal intensity $^1$H-NMR (SI) of the unit volume (voxel) and the main contribution to that SI is due to the protons of water, which represents the main component of biological tissues. The contrast in an MRI image can be varied both through strictly instrumental procedures (such as, for example, excitation sequences and signal acquisition) and by using contrast agents (CAs). Typical contrast agents for MRI are for example paramagnetic substances which, once administered, make it possible to reduce the relaxation times $T_1$ and $T_2$ of the water protons in the anatomical region in which they are distributed. Indeed, one of the most important features characterising a contrast agent for magnetic resonance is precisely relaxivity, which quantifies the change induced in $T_1$ or $T_2$ as a function of the concentration of the contrast agent. As early as the 1980s, among the various paramagnetic substances available, paramagnetic metal complexes were identified as the ideal candidates to be used as contrast agents for MRI. In particular, the metal ion $Gd^{3+}$ demonstrated to be especially effective, as it is characterised by a high degree of paramagnetism (7 unpaired electrons) and a relatively long electron relaxation time. Furthermore, $Gd^{3+}$ is capable of forming coordination complexes with a high thermodynamic stability with octadentate ligands that are both linear, as for example in the case of DTPA (diethylenetriaminepentaacetic acid), and cyclical, as in the case of DOTA (1,4,7,10-tetraazacyclododecane-1,4,7,10-tetraacetic acid). In these complexes, eight coordination sites for the metal ion are occupied by donor atoms (N and O) of the ligand, whereas the ninth position can be occupied by a water molecule. This proves to be particularly advantageous since, when used as a contrast agent and once distributed in the aqueous environment of the anatomic region of diagnostic interest, the $Gd^{3+}$ complex is capable of exchanging the water molecule coordinated with it with the water molecules of the external solvent, thus transferring the paramagnetic effect to the whole set of water protons in the surrounding microenvironment. Also as regards relaxivity, gadolinium complexes show excellent values (3-4 $mM^{-1}s^{-1}$), which can increase significantly in the case of complexes like Gd-BOPTA (gadobenic acid), Gd-EOB-DTPA (gadoxetic acid) or MS-325 (Gadofosveset) when used in human blood serum thanks to the presence of hydrophobic substituents on their surface which are capable of reversibly interacting with the albumin present in the serum. Therefore, though gadolinium complexes show to have excellent properties as contrast agents and are today the instrument of choice for MRI diagnostics, as the $Gd^{3+}$ ion is in itself toxic for the human body (mainly due to an antagonistic behaviour towards $Ca^{24}$ ions), numerous efforts have been (and are still being) dedicated to producing increasingly stable complexes, i.e. complexes that do not release free $Gd^{3+}$ ions and can be excreted in quantities that are as close as possible to 100% of the dose administered to the patient. Notwithstanding the known toxicity of the $Gd^{3+}$ ion in its free form, however, until a few years ago the scientific community agreed in judging that contrast agents based on stable gadolinium complexes (generally referred to as "gadolinium-based contrast agents"—GBCAs) were substances devoid of any toxicity. However, this conviction was weakened when, about ten years ago, a relationship was shown between the administration of some gadolinium complexes and the pathology referred to as NSF (nephrogenic systemic fibrosis), though the etiology of said pathology seems to be limited to the concomitant presence, in the patient, of a limited glomerular filtration (<30 mL/min). More recently, another source of concern in relation to the potential toxicity of GBCAs was brought forward following the observation of very small amounts of gadolinium retained in the body of patients to whom a GBCA was administered, also in the absence of kidney failure. The amount retained appears to depend on the number of doses administered and the type of complexes. Although no evidence of clinical relevance (toxic or acute) associable with Gd retention has yet been reported, the European Medicines Agency (EMA) has withdrawn marketing authorisation for some Gd complexes believed to be most involved in so-called "Gd-retention" processes. Together these considerations have thus induced the scientific community to look for alternative solutions enabling advantages to be obtained in terms of efficiency which are similar to those obtainable with the use of gadolinium complexes, but at the same offer greater safety guarantees as regards the toxicological aspects. Attention has thus been turned towards paramagnetic complexes of endogenous metal ions, such as $Mn^{2+}$ and $Fe^{3+}$, with the expectation that the "management" of these metals by biological tissues, given that they are essential for the human body, might be facilitated compared to that of a non-essential element such as gadolinium, for which no biological recycling processes exist. As regards $Mn^{2+}$ (5 unpaired electrons), to date no ligands have been found which can guarantee a thermodynamic stability such as to avoid the transfer of part of the $Mn^{2+}$ ions to biomolecules (such as, for example, albumin). In parallel, as reported for example in the publication by Worah D. et al. ("Ferrioxamine as a magnetic resonance contrast agent: preclinical studies and phase I and II human clinical trials"; *Invest Radiol* 1988; 23 (Suppl): S281-S285), various efforts have also focused on seeking out $Fe^{3+}$ complexes (likewise having 5 unpaired electrons) which might be used as contrast agents for MRI, as an alternative to GBCAs. However, at the present state of the art, the relaxivity of $Fe^{3+}$ complexes has shown to be too low (about 2 $mM^{-1}s^{-1}$) and not competitive with that of $Gd^{3+}$ complexes, still today at the basis of the most widely disseminated and used contrast agents. The main reason for this is to be found in the fact that in order to be able to guarantee a good thermodynamic stability of the complex it is necessary for all six $Fe^{3+}$ ion coordination sites to be occupied by ligand donor atoms. However, in such a case the possibility of coordinating the water molecule (as occurs in the case of gadolinium-based complexes) is lost, thus leaving active only the contributions to relaxivity generated by water molecules or mobile protons ascribable to the second coordination sphere or an outer-sphere water molecule.

The present invention solves the above-described problems of the prior art by providing a contrast agent for MRI that shows good relaxivity, is characterised by good solubility in an aqueous environment, so as to be able to be administered to a patient using limited volumes of solution, and is excreted by the body of the patient him/herself in intact form. The Applicant has in fact surprisingly found that, by using an iron complex with deferasirox (DFX=4-[(3,5-bis-(2-hydroxyphenyl)-1,2,4)triazol-1-yl]benzoic acid, ICL670) and derivatives thereof, normally used in chelation therapy to treat iron overload and accumulation in the body (as described for example in EP0914118), it is possible to provide an iron-based contrast agent for MRI characterised by having a relaxivity that is significantly increased compared to the previously studied Fee complexes and is at the same time completely excreted from the human body. With the present invention, the Applicant further provides a contrast agent for MRI whose solubility can be controlled by salification of the aforesaid iron complex with deferasirox and derivatives thereof and/or through pharmaceutical formulations.

Object of the Invention

The present invention relates to an iron complex having the general formula (I):

(I)

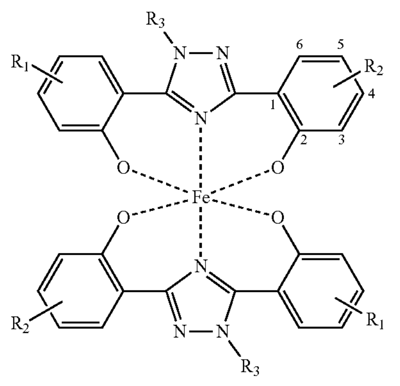

or a pharmaceutically acceptable salt thereof, wherein: $R_1$ and $R_2$ are both in position 3 or both in position 5 of the aromatic ring and, simultaneously with or independently of each other, they are selected from: H, halogen, $C_1$-$C_5$ alkyl, $C_1$-$C_5$ alkoxyl; and $R_3$ is selected from: H, $C_1$-$C_5$ alkyl, $C_1$-$C_5$ hydroxyalkyl, $C_1$-$C_5$ carboxyalkyl, aryl possibly substituted with at least one group selected from: COOH, halogen, $C_1$-$C_5$ alkyl, $C_1$-$C_5$ alkoxyl, OH, $NZ_2$, $CONZ_2$, wherein Z is simultaneously or independently selected from: H, $C_1$-$C_5$ alkyl; said at least one group preferably being in position 4 of the aromatic ring of said aryl.

The subject matter of the present invention also relates to a pharmaceutical composition formulated for oral and/or parenteral administration, preferably intravenous, said pharmaceutical composition preferably being formulated as an aqueous solution comprising said complex or salt. The present invention further relates to said complex or a salt thereof or said pharmaceutical composition for use as a contrast agent for magnetic resonance imaging (MRI), as well as a method and a kit for in situ preparation of said complex or salt and said pharmaceutical composition.

DETAILED DESCRIPTION OF PREFERRED EMBODIMENTS OF THE INVENTION

Figure 1:
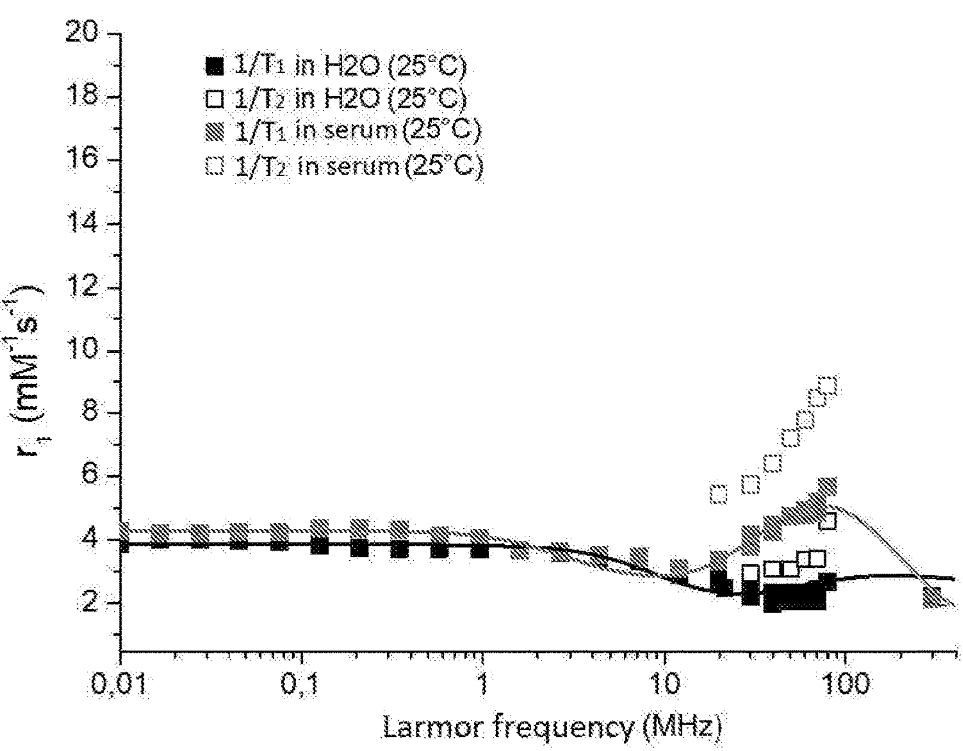
FIG. 1 shows the $1/T_1$ $H^1$-NMRD profiles, recorded at 25° C. in water and in human serum, in the range of Larmor frequencies comprised between 0.01 and 80 MHz and the $1/T_2$ $H^1$-NMRD profiles in the range of Larmor frequencies comprised between 20 and 80 MHz of the $Fe(DFX)_2$ complex according to the present invention.

For the purposes of the present invention, the terms "human blood serum" and "human serum" are used as perfectly interchangeable synonyms.

For the purposes of the present invention, the expression "possibly substituted" means that the group indicated can be unsubstituted, or substituted in one or two or three positions.

The term "halogen" means, for the purposes of the present invention, an element of the halogen group, selected from: fluorine, chlorine, bromine or iodine.

For the purposes of the present invention, "$C_1$-$C_5$ alkyl" indicates a linear- or branched-chain alkyl group containing from a minimum of one to a maximum of five carbon atoms. Similarly, "$C_1$-$C_3$ alkyl" means a linear- or branched-chain alkyl group containing from a minimum of one to a maximum of three carbon atoms. Similarly, "$C_1$-$C_2$ alkyl" means a linear- or branched-chain alkyl group containing from a minimum of one to a maximum of two carbon atoms.

"$C_1$-$C_5$ alkoxyl" indicates a linear- or branched-chain alkoxyl group containing from a minimum of one to a maximum of five carbon atoms. Similarly, "$C_1$-$C_3$ alkoxyl" means a linear- or branched-chain alkoxyl group containing from a minimum of one to a maximum of three carbon atoms.

For the purposes of the present invention, "$C_1$-$C_5$ hydroxyalkyl" indicates a $C_1$-$C_5$ alkyl group substituted with one or more hydroxyl groups. Similarly, "$C_1$-$C_5$ hydroxyalkyl" indicates a $C_1$-$C_3$ alkyl group substituted with one or more hydroxyl groups.

For the purposes of the present invention, "$C_1$-$C_5$ carboxyalkyl" indicates a $C_1$-$C_5$ alkyl group substituted with one or more carboxylic groups. Similarly, "$C_1$-$C_3$ carboxyalkyl" indicates a $C_3$ alkyl group substituted with one or more carboxylic groups.

For the purposes of the present invention, "aryl" indicates a carbocyclic ring system having from 6 to 15 carbon atoms. Said system can be a monocyclic, bicyclic or tricyclic system.

For the purposes of the present invention, the term "pharmaceutically acceptable salt" refers to a salt that maintains the effectiveness and biological properties of the iron complex having the general formula (I) according to the embodiments of the present invention and which is typically not biologically or otherwise undesirable.

The subject matter of the present invention relates to an iron complex having the general formula (I):

(I)

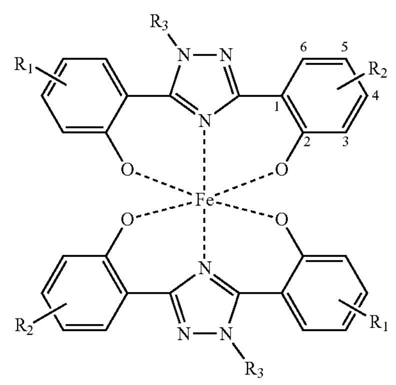

or a pharmaceutically acceptable salt thereof, wherein:

$R_1$ and $R_2$ are both in position 3 or both in position 5 of the aromatic ring and, simultaneously with or independently of each other, they are selected from: H, halogen, $C_1$-$C_5$ alkyl, $C_1$-$C_5$ alkoxyl; $R_3$ is selected from: H, $C_1$-$C_5$ alkyl, $C_1$-$C_5$ hydroxyalkyl, $C_1$-$C_5$ carboxyalkyl, aryl possibly substituted with at least one group selected from: COOH, halogen, $C_1$-$C_5$ alkyl, $C_1$-$C_5$ alkoxyl, OH, $NZ_2$, $CONZ_2$, wherein Z is simultaneously or independently selected from: H, $C_1$-$C_5$ alkyl; said at least one group preferably being in position 4 of the aromatic ring of said aryl.

According to a preferred embodiment of the invention, $R_1$ and $R_2$ are both in position 3 or both in position 5 of the aromatic ring and, simultaneously with or independently of each other, they are selected from: H, halogen, $C_1$-$C_3$ alkyl, $C_1$-$C_3$ alkoxyl. According to another preferred embodiment of the invention, $R_3$ is selected from: H, $C_1$-$C_3$ alkyl, $C_1$-$C_3$ hydroxyalkyl, $C_1$-$C_3$ carboxyalkyl, aryl possibly substituted with at least one group selected from: COOH, halogen, $C_1$-$C_3$ alkyl, $C_1$-$C_3$ alkoxyl, OH, $NZ_2$, $CONZ_2$, wherein Z is simultaneously or independently selected from: H, $C_1$-$C_2$ alkyl; said at least one group preferably being in position 4 of the aromatic ring of said aryl.

According to a preferred embodiment, the subject matter of the present invention relates to an iron complex having the general formula (I) or a pharmaceutically acceptable salt thereof, wherein: $R_1$ and $R_2$ are both in position 3 or both in position 5 of the aromatic ring and, simultaneously with or independently of each other, they are selected from: H, halogen, $C_1$-$C_3$ alkyl, $C_1$-$C_3$ alkoxyl; and $R_3$ is selected from: H, $C_1$-$C_3$ alkyl, $C_1$-$C_3$ hydroxyalkyl, $C_1$-$C_3$ carboxyalkyl, aryl possibly substituted with at least one group selected from: COOH, halogen, $C_1$-$C_3$ alkyl, $C_1$-$C_3$ alkoxyl, OH, $NZ_2$, $CONZ_2$, wherein Z is simultaneously or independently selected from: H, $C_1$-$C_2$ alkyl; said at least one group preferably being in position 4 of the aromatic ring of said aryl.

According to another preferred embodiment, the subject matter of the present invention relates to an iron complex having the general formula (I) or a pharmaceutically acceptable salt thereof, wherein: $R_1$ and $R_2$ are both in position 5 of the aromatic ring. According to a particularly preferred embodiment of the invention, $R_3$ is an aryl possibly substituted with a group selected from: COOH, halogen, $C_1$-$C_5$ alkyl, $C_1$-$C_5$ alkoxyl, OH, $NZ_2$, $CONZ_2$, wherein Z simultaneously or independently selected from: H, $C_1$-$C_5$ alkyl; said group being in position 4 of the aromatic ring of said aryl. Preferably, $R_3$ is an aryl possibly substituted with a group selected from: COOH, halogen, $C_1$-$C_3$ alkyl, $C_1$-$C_3$ alkoxyl, OH, $NZ_2$, $CONZ_2$, wherein Z is simultaneously or independently selected from: H, $C_1$-$C_2$ alkyl; said group being in position 4 of the aromatic ring of said aryl.

According to a particularly preferred embodiment, the subject matter of the present invention relates to an iron complex having the general formula (I) or a pharmaceutically acceptable salt thereof wherein:

$R_1$ and $R_2$ are both in position 3 or both in position 5 of the aromatic ring and, simultaneously, H; and $R_3$ is an aryl substituted with a COOH group in position 4 of the aromatic ring thereof, according to the following formula (Ia):

(Ia)

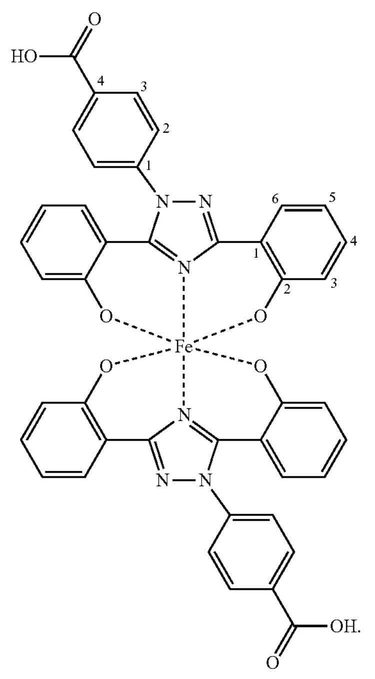

Said iron complex having the formula (Ia) or a pharmaceutically acceptable salt thereof can also be indicated, for the purposes of the present invention, as $Fe(DFX)_2$, wherein DFX indicates 4-[(3,5-bis-(2-hydroxyphenyl)-1,2,4)triazol-1-yl]-benzoic acid, known by the trade name Deferasirox, Exjade. According to one embodiment, the iron complex having the formula (I) or a pharmaceutically acceptable salt thereof according to the present invention is in the form of a racemic or enantiomerically enriched mixture. According to a particularly preferred embodiment, the present invention relates to a pharmaceutically acceptable salt of the iron complex having the formula (I), wherein said salt is obtained by salification of said complex. In other words, said pharmaceutically acceptable salt is an iron complex having the general formula (I), salified with an inorganic or organic base, said inorganic or organic base preferably being selected in the group consisting of: a salt of an alkali metal or alkaline earth metal, an amine, an amino alcohol. Said amino alcohol is preferably selected in the group consisting of: tris(hydroxymethyl)aminomethane, glucosamine, glucamine, methylglucamine (meglumine), more preferably meglumine. Preferably, said pharmaceutically acceptable salt is a salt obtained from the reaction of the iron complex having the formula (I) according to the present invention with meglumine. According to a particularly preferred embodiment, said pharmaceutically acceptable salt is a salt obtained from the reaction of the iron complex having the formula (Ia) according to the present invention with meglumine. Preferably, the iron complex having the general formula (I) or a pharmaceutically acceptable salt thereof according to the present invention as previously described is characterised by having a relaxivity in human serum greater than 2.5 $mM^{-1}s^{-1}$, preferably greater than 3.4 $mM^{-1}$ $s^{-1}$ (relaxivity of Gd-DTPA), said relaxivity being measured at 37° C. and 1T.

According to the preferred embodiment of the invention wherein the iron complex according to the present invention is a complex having the formula (Ia) or a pharmaceutically acceptable salt thereof, preferably meglumine, said relaxivity in human serum is greater than 3.5 $mM^{-1}$ $s^{-1}$, said relaxivity being measured at 37° C. and 1T. The Applicant has found that the iron complex having the general formula (I) or a pharmaceutically acceptable salt thereof according to the present invention, preferably the iron complex having the formula (Ia) or a pharmaceutically acceptable salt thereof, preferably meglumine, binds stably to the albumin present in human serum, thus forming an adduct. Therefore, without wishing to be bound by a specific theory, it is possible to maintain that the high relaxivity, in human serum, of the iron complex or a salt thereof according to the present invention is due to the combination of: i) an electron relaxation time ($T_{1e}$) of the $Fe^{3+}$ ion which becomes longer as the applied magnetic field increases and following the formation of the adduct with albumin and ii) a particularly long molecular reorientation time ($T_R$) of the adduct with albumin, i.e. comprised between 10 and 50 ns, preferably between 15 and 45 ns. In other words, it is possible to maintain that the relaxivity of the iron complex or a pharmaceutically acceptable salt thereof according to the present invention increases as the applied magnetic field increases until $1/T_C$ comes to be determined by $T_R$ according to the following formula:

$$1/T_C=1/T_R+1/T_{1e}$$

Preferably, the iron complex having the general formula (I) or a pharmaceutically acceptable salt thereof according to the present invention is further characterised by having a high thermodynamic stability, i.e. a thermodynamic stability greater than 25 log $\beta_2$, preferably greater than 30 log $\beta_2$. According to the preferred embodiment of the invention wherein the iron complex according to the present invention is a complex having the formula (Ia) or a pharmaceutically acceptable salt thereof, preferably meglumine, said thermodynamic stability is comprised between 35 and 40 log $\beta_2$. The subject matter of the present invention further relates to a pharmaceutical composition comprising an iron complex having the general formula (I) or a pharmaceutically acceptable salt thereof as previously described and one or more excipients, diluents and/or pharmaceutically acceptable media. Said excipients are preferably selected in the group consisting of: NaCl, HCl, NaOH, sulphuric acid and sodium salts thereof, phosphoric acid and sodium salts thereof, citric acid and sodium salts thereof, ascorbic acid, sodium ascorbate, sodium carbonate, disodium carbonate, EDTA, benzalkonium chloride. Said diluents are preferably selected in the group consisting of: water for injection, saline solution, solutions of dextrose, ethanol, propylene glycol. Said pharmaceutically acceptable media are preferably selected in the group consisting of: dextrose, mannitol, dextran, cyclodextrins (α, γ, HP-β). According to one embodiment, the pharmaceutical composition according to the present invention is formulated for oral and/or parenteral administration. Preferably, said pharmaceutical composition is formulated for intravenous administration. According to a particularly preferred embodiment, said pharmaceutical composition is formulated as an aqueous solution. Said pharmaceutical composition is preferably stable for an extended period, i.e. for a period comprised between 5 days and 12 months, preferably between 5 days and 1 month. The present invention also relates to an iron complex having the general formula (I) or a pharmaceutically acceptable salt thereof or the pharmaceutical composition as previously described for use as a contrast agent for magnetic resonance imaging (MRI). According to a preferred embodiment, the iron complex having the general formula (I) or a pharmaceutically acceptable salt thereof or the pharmaceutical composition as previously described are used in a dosage comprised between 0.005 and 0.5 mmol/kg, preferably between 0.01 and 0.3 mmol/kg.

Advantageously, as also demonstrated in the examples section, said iron complex or salt thereof or said pharmaceutical composition, when used as a contrast agent for MRI, shows performances in terms of the entity of contrast of the acquired image ($T_1$-weighted image) comparable to those obtained using (under the same experimental conditions and at the same dosage) a gadolinium-based complex normally used in the sector (gadopentetic acid, Gd-DTPA, known by the trade name Magnevist). Furthermore, as previously described, the high thermodynamic stability of the complex or pharmaceutically acceptable salt thereof according to the present invention is particularly advantageous, as it is such that, once said complex or a salt thereof is administered, preferably in the form of a pharmaceutical composition, to a patient for use as a contrast agent for MRI, preferably by intravenous administration, said complex or a salt thereof maintains its structural integrity intact. Without wishing to be bound by a specific theory, it is possible to hypothesise that the iron complex having the general formula (I) or a pharmaceutically acceptable salt thereof according to the present invention, precisely thanks to the thermodynamic stability described above, does not interfere with the endogenous pool of iron ions or with that of other ions present in the body of the patient, nor does it trigger Fenton-type reactions, and is thus particularly advantageous for applications as a contrast agent for MAI. The subject matter of the present invention further relates to a method for in situ preparation of an iron complex having the general formula (I) or a pharmaceutically acceptable salt thereof as previously described. For the purposes of the present invention "in situ preparation" means that said iron complex or pharmaceutically acceptable salt thereof is generated by mixing the appropriate ingredients, at the time of or a few minutes before oral and/or parenteral administration to the patient. The method according to the present invention therefore comprises the step of mixing, preferably at the time of oral and/or parenteral administration:

(i) a compound having the general formula (II):

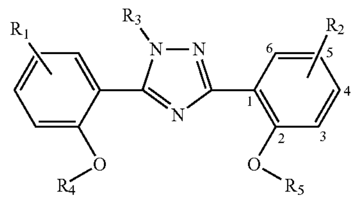

(II)

wherein:

$R_1$ and $R_2$ are both in position 3 or both in position 5 of the aromatic ring and, simultaneously with or independently of each other, they are selected from: H, halogen, $C_1$-$C_5$ alkyl, $C_1$-$C_5$ alkoxyl; $R_3$ is selected from: H, $C_1$-$C_5$ alkyl, $C_1$-$C_5$ hydroxyalkyl, $C_1$-$C_5$ carboxyalkyl, aryl possibly substituted with at least one group selected from: COOH, halogen, $C_1$-$C_5$ alkyl, $C_1$-$C_5$ alkoxyl, OH, $NZ_2$, $CONZ_2$, wherein Z is simultaneously or independently selected from: H, $C_1$-$C_5$ alkyl; said at least one group preferably being in position 4 of the aromatic ring of said aryl;

$R_4$ and $R_5$, simultaneously with or independently of each other, are selected from: H, $C_1$-$C_4$ alkanoyl or aroyl possibly substituted with at least one group selected from: COOH, $C_1$-$C_2$ alkyl, $C_1$-$C_2$ alkoxyl, OH; said at least one group preferably being in position 4 of the aromatic ring of said aroyl;

with (ii) an iron compound capable of providing Fe(III) ions, preferably selected in the group consisting of: iron oxide, iron hydroxide, iron chloride, iron sulphate, iron citrate, iron fumarate, iron gluconate, iron tartrate, iron ammonium sulphate, iron carbonate, until forming an iron complex having the general formula (I);

or with (iii) an inorganic or organic base, preferably selected in the group consisting of: a salt of an alkali metal or alkaline earth metal, an amine, an amino alcohol, said amino alcohol preferably being selected in the group consisting of: tris(hydroxymethyl)aminomethane, glucosamine, glucamine, N-methylglucamine (meglumine) until forming a pharmaceutically acceptable salt of the compound having the general formula (II), and subsequently mixing with an iron compound capable of providing Fe(III) ions preferably selected in the group consisting of iron oxide, iron hydroxide, iron chloride, iron sulphate, iron citrate, iron fumarate, iron gluconate, iron tartrate, iron ammonium sulphate, iron carbonate, until forming a pharmaceutically acceptable salt of the iron complex having the general formula (I).

According to one embodiment of the method according to the present invention, said amino alcohol is meglumine. According to a preferred embodiment of the method according to the invention, $R_1$ and $R_2$ are both in position 3 or both in position 5 of the aromatic ring and, simultaneously with or independently of each other, they are selected from: H, halogen, $C_1$-$C_3$ alkyl, $C_1$-$C_3$ alkoxyl. According to another preferred embodiment of the method of the invention, $R_3$ is selected from: H, $C_1$-$C_3$ alkyl, $C_1$-$C_3$ hydroxyalkyl, $C_1$-$C_3$ carboxyalkyl, aryl possibly substituted with at least one group selected from: COOH, halogen, $C_1$-$C_3$ alkyl, $C_1$-$C_3$alkoxyl, OH, $NZ_2$, $CONZ_2$, wherein Z is simultaneously or independently selected from: H, $C_1$-$C_2$ alkyl; said at least one group preferably being in position 4 of the aromatic ring of said aryl.

Preferably, according to a preferred embodiment of the method according to the present invention, $R_1$ and $R_2$ are both in position 3 or both in position 5 of the aromatic ring and, simultaneously with or independently of each other, they are selected from: H, halogen, $C_1$-$C_3$ alkyl, $C_1$-$C_3$ alkoxyl; and $R_3$ is selected from: H, $C_1$-$C_3$ alkyl, $C_1$-$C_3$ hydroxyalkyl, $C_1$-$C_3$ carboxyalkyl, aryl possibly substituted with at least one group selected from: COOH, halogen, $C_1$-$C_3$ alkyl, $C_1$-$C_3$ alkoxyl, OH, $NZ_2$, $CONZ_2$, wherein Z is simultaneously or independently selected from: H, $C_1$-$C_2$ alkyl; said at least one group preferably being in position 4 of the aromatic ring of said aryl.

According to another preferred embodiment of the method according to the present invention, $R_1$ and $R_2$ are both in position 5 of the aromatic ring. According to a particularly preferred embodiment of the method according to the present invention, $R_3$ is an aryl possibly substituted with a group selected from: COOH, halogen, $C_1$-$C_3$ alkyl, $C_1$-$C_5$ alkoxyl, OH, $NZ_2$, $CONZ_2$, wherein Z is simultaneously or independently selected from: H, $C_1$-$C_5$alkyl; said group being in position 4 of the aromatic ring of said aryl. Preferably, $R_3$ is an aryl possibly substituted with a group selected from: COOH, halogen, $C_1$-$C_3$ alkyl, $C_1$-$C_3$ alkoxyl, OH, $NZ_2$, $CONZ_2$, wherein Z is simultaneously or independently selected from: H, $C_1$-$C_2$ alkyl; said group being in position 4 of the aromatic ring of said aryl. According to a particularly preferred embodiment of the method according to the present invention, $R_1$ and $R_2$ are both in position 3 or both in position 5 of the aromatic ring and, simultaneously, H; and $R_3$ is an aryl substituted with a COOH group in position 4 of the aromatic ring. According to a particularly preferred embodiment, the method according to the present invention comprises the step of mixing, preferably at the time of oral and/or parenteral administration:

(i) a compound having the general formula (II):

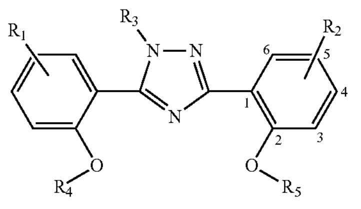

(II)

wherein:

$R_1$ and $R_2$ are both in position 3 or both in position 5 of the aromatic ring and, simultaneously, H; and $R_3$ is an aryl substituted with a COOH group in position 4 of the aromatic ring; and $R_4$ and $R_5$, simultaneously with or independently of each other, are selected from: H, $C_1$-$C_4$ alkanoyl or aroyl possibly substituted with at least one group selected from: COOH, $C_1$-$C_2$ alkyl, $C_1$-$C_2$ alkoxyl, OH; said at least one group preferably being in position 4 of the aromatic ring of said aroyl;

with (iii) an inorganic or organic base selected in the group consisting of: a salt of an alkali metal or alkaline earth metal, an amine, an amino alcohol, said amino alcohol preferably being selected in the group consisting of: tris(hydroxymethyl)aminomethane, glucosamine, glucamine, N-methylglucamine (meglumine), until forming a pharmaceutically acceptable salt of the compound having the general formula (II), and subsequently mixing with an iron compound. Preferably, said compound capable of providing Fe(III) ions can be selected in the group consisting of iron oxide, iron hydroxide, iron chloride, iron sulphate, iron citrate, iron fumarate, iron gluconate, iron tartrate, iron ammonium sulphate, iron carbonate, until forming a pharmaceutically acceptable salt of the iron complex having the formula (Ia). According to one embodiment of the method according to the present invention, said amino alcohol is meglumine.

The present invention also relates to a method for in situ preparation of a pharmaceutical composition as previously described. For the purposes of the present invention, "in situ preparation" means that said pharmaceutical composition is generated, by mixing the appropriate ingredients, at the time of or a few minutes before oral and/or parenteral administration to the patient. Said method for in situ preparation of a pharmaceutical composition according to the present invention thus comprises the step of mixing, preferably at the time of oral and/or parenteral administration, the iron complex having the general formula (I) or a pharmaceutically acceptable salt thereof obtained according to the method previously described with: (iv) one or more excipients, diluents and/or pharmaceutically acceptable media. Said excipients are preferably selected in the group consisting of: NaCl, HCl, NaOH, sulphuric acid and sodium salts thereof, phosphoric acid and sodium salts thereof, citric acid and sodium salts thereof, ascorbic acid, sodium ascorbate, sodium carbonate, disodium carbonate, EDTA, benzalkonium chloride. Said diluents are preferably selected in the group consisting of: water for injection, saline solution, solutions of dextrose, ethanol, propylene glycol. Said pharmaceutically acceptable media are preferably selected in the group consisting of: dextrose, mannitol, dextran, cyclodextrins (α, γ, HP-β). The present invention further relates to a kit for in situ preparation of the iron complex having the general formula (I) or a pharmaceutically acceptable salt thereof according to the method previously described. Said kit comprises at least two separate containers wherein:

(i) a first container comprises a compound having the general formula (II); and (ii) a second container comprises an iron (III) compound.

Said compound having the general formula (II) and said iron (III) compound are as previously described. According to one embodiment of the invention, said kit optionally comprises a third container comprising one or more excipients, diluents and/or pharmaceutically acceptable media for the preparation of a pharmaceutical composition as previously described. According to a particularly preferred embodiment of the invention, said kit comprises one or more excipients, diluents and/or pharmaceutically acceptable media for the preparation of a pharmaceutical composition as previously described, said one or more excipients diluents and/or pharmaceutically acceptable media being contained in at least one of the two separate containers (i)-(ii). According to a particularly preferred embodiment of the invention, said kit comprises at least three separate containers wherein:

(i) a first container comprises a compound having the general formula (II);

(ii) a second container comprises an iron (III) compound; and (iii) a third container comprises an inorganic or organic base.

Said compound having the general formula (II), said iron (III) compound and said inorganic or organic base are as previously described.

According to a particularly preferred embodiment of the invention, said kit comprises one or more excipients diluents and/or pharmaceutically acceptable media for the preparation of a pharmaceutical composition as previously described, said one or more excipients diluents and/or pharmaceutically acceptable media being contained in at least one of the three separate containers (i)-(iii).

According to a particularly preferred embodiment, the subject matter of the present invention relates to a pharmaceutical composition comprising an iron complex having the general formula (I):

(I)

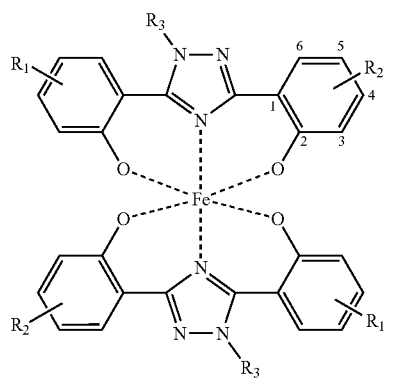

or a pharmaceutically acceptable salt thereof, wherein:

$R_1$ and $R_2$ are both in position 3 or both in position 5 of the aromatic ring and, simultaneously with or independently of each other, they are selected from: H, halogen, $C_1$-$C_5$ alkyl, $C_1$-$C_5$ alkoxyl; and $R_3$ is selected from: H, $C_1$-$C_5$ alkyl, $C_1$-$C_5$ hydroxyalkyl, $C_1$-$C_5$ carboxyalkyl, aryl possibly substituted with at least one group selected from: COOH, halogen, $C_1$-$C_5$ alkyl, $C_1$-$C_5$ alkoxyl, OH, $NZ_2$, $CONZ_2$, wherein Z is simultaneously or independently selected from: H, $C_1$-$C_5$ alkyl; said at least one group preferably being in position 4 of the aromatic ring of said aryl;

and one or more excipients, diluents and/or pharmaceutically acceptable media.

Preferably, $R_1$ and $R_2$ are both in position 3 or both in position 5 of the aromatic ring and, simultaneously with or independently of each other, they are selected from: H, halogen, $C_1$-$C_3$ alkyl, $C_1$-$C_3$ alkoxyl; and $R_3$ is selected from: H, $C_1$-$C_5$ alkyl, $C_1$-$C_3$ hydroxyalkyl, $C_1$-$C_3$ carboxyalkyl, aryl possibly substituted with at least one group selected from: COOH, halogen, $C_1$-$C_3$ alkyl, $C_1$-$C_3$ alkoxyl, OH, $NZ_2$, $CONZ_2$, wherein Z is simultaneously or independently selected from: H, $C_1$-$C_2$ alkyl; said at least one group preferably being in position 4 of the aromatic ring of said aryl.

Preferably, $R_1$ and $R_2$ are both in position 5 of the aromatic ring. Preferably, $R_3$ is an aryl possibly substituted with a group selected from: COOH, halogen, $C_1$-$C_5$ alkyl, preferably $C_1$-$C_3$ alkyl, $C_1$-$C_5$ alkoxyl, preferably $C_1$-$C_3$ alkoxyl, OH, $NZ_2$, $CONZ_2$, wherein Z is simultaneously or independently selected from: H, $C_1$-$C_5$ alkyl, preferably $C_1$-$C_2$ alkyl; said group being in position 4 of the aromatic ring of said aryl. According to a particularly preferred embodiment, the iron complex is an iron complex having the general formula (I), wherein $R_1$ and $R_2$ are both in position 3 or both in position 5 of the aromatic ring and, simultaneously, H; and $R_3$ is an aryl substituted with a COOH group in position 4 of the aromatic ring, i.e. it is an iron complex having the following formula (Ia):

(Ia)

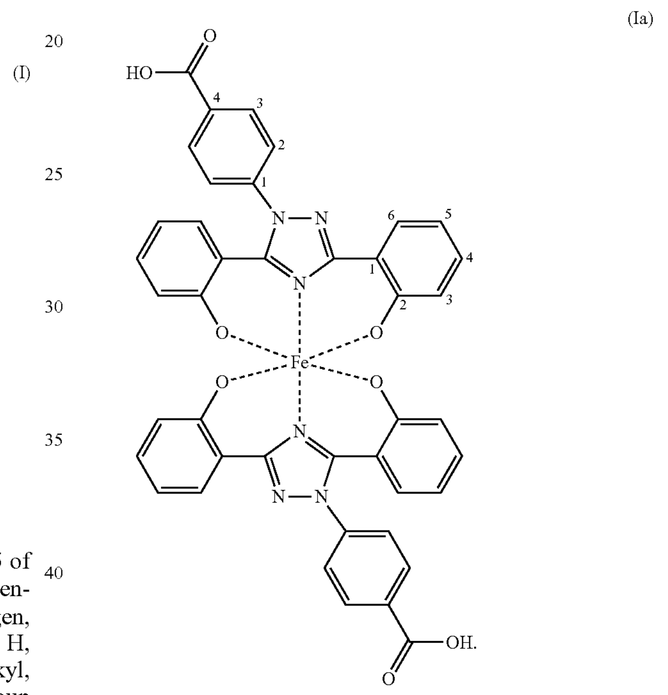

Preferably, the pharmaceutical composition according to the present invention comprises said iron complex having the general formula (I) (or (Ia)) or a pharmaceutically acceptable salt thereof in the form of a racemic or enantiomerically enriched mixture. Preferably, said pharmaceutically acceptable salt is an iron complex having the general formula (I) (or (Ia)), as described above, salified with an inorganic or organic base preferably selected in the group consisting of: a salt of an alkali metal or alkaline earth metal, an amine, an amino alcohol, said amino alcohol preferably being selected in the group consisting of: tris(hydroxymethyl)aminomethane, glucosamine, glucamine, N-methylglucamine (meglumine), preferably N-methylglucamine (meglumine). According to a preferred embodiment of the invention, said pharmaceutically acceptable salt is obtained from the reaction of the iron complex having the general formula (I) (or (Ia)) with meglumine. Preferably, the pharmaceutical composition according to the present invention is formulated as an aqueous solution.

The present invention also relates to an iron complex having the general formula (I):

(I)

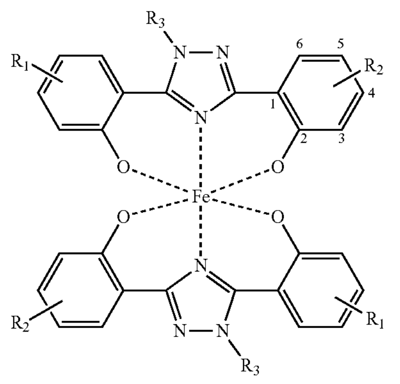

or a pharmaceutically acceptable salt thereof, wherein:

$R_1$ and $R_2$ are both in position 3 or both in position 5 of the aromatic ring and, simultaneously with or independently of each other, they are selected from: H, halogen, $C_1$-$C_5$ alkyl, $C_1$-$C_5$ alkoxyl; and $R_3$ is selected from: H, $C_1$-$C_5$ alkyl, $C_1$-$C_5$ hydroxyalkyl, $C_1$-$C_5$carboxyalkyl, aryl, possibly substituted with at least one group selected from: COOH, halogen, $C_1$-$C_5$ alkyl, $C_1$-$C_5$ alkoxyl, OH, $NZ_2$, $CONZ_2$, wherein Z is simultaneously or independently selected from: H, $C_1$-$C_5$ alkyl; said at least one group preferably being in position 4 of the aromatic ring of said aryl;

or the pharmaceutical composition as previously described, for use as a contrast agent for magnetic resonance imaging (MRI).

Preferably, $R_1$ and $R_2$ are both in position 3 or both in position 5 of the aromatic ring and, simultaneously with or independently of each other, they are selected from: H, halogen, $C_1$-$C_3$ alkyl, $C_1$-$C_3$ alkoxyl; and $R_3$ is selected from: H, $C_1$-$C_3$ alkyl, $C_1$-$C_5$ hydroxyalkyl, $C_1$-$C_3$ carboxyalkyl, aryl possibly substituted with at least one group selected from: COOH, halogen, $C_1$-$C_3$ alkyl, $C_1$-$C_3$ alkoxyl, OH, $NZ_2$, $CONZ_2$, wherein Z is simultaneously or independently selected from: H, $C_1$-$C_2$ alkyl; said at least one group preferably being in position 4 of the aromatic ring of said aryl.

Preferably, $R_1$ and $R_2$ are both in position 5 of the aromatic ring. Preferably, $R_3$ is an aryl possibly substituted with a group selected from: COOH, halogen, $C_1$-$C_5$ alkyl, preferably $C_1$-$C_3$ alkyl, $C_1$-$C_5$ alkoxyl, preferably $C_1$-$C_3$ alkoxyl, OH, $NZ_2$, $CONZ_2$, wherein Z is simultaneously or independently selected from: H, $C_1$-$C_5$ alkyl, preferably $C_1$-$C_2$ alkyl; said group being in position 4 of the aromatic ring of said aryl. According to a particularly preferred embodiment, the iron complex is an iron complex having the general formula (I), wherein $R_1$ and $R_2$ are both in position 3 or both in position 5 of the aromatic ring and, simultaneously, H; and $R_3$ is an aryl substituted with a COOH group in position 4 of the aromatic ring, i.e. it is an iron complex having the following formula (Ia):

(Ia)

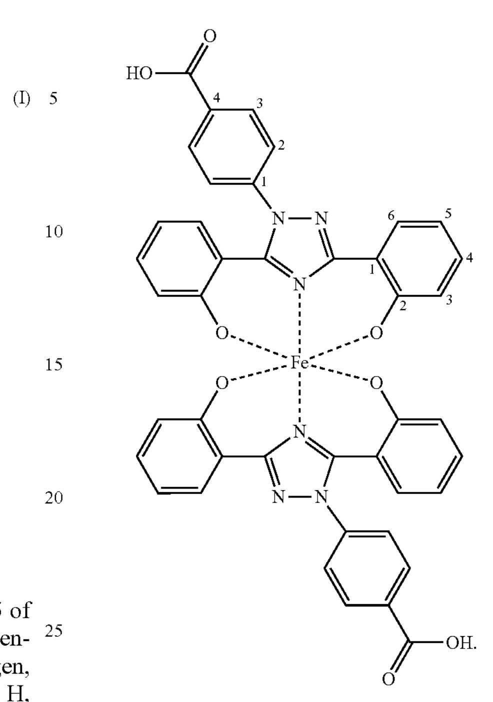

The present invention also relates to a pharmaceutically acceptable salt obtained from the reaction of an iron complex having the general formula (I)

(I)

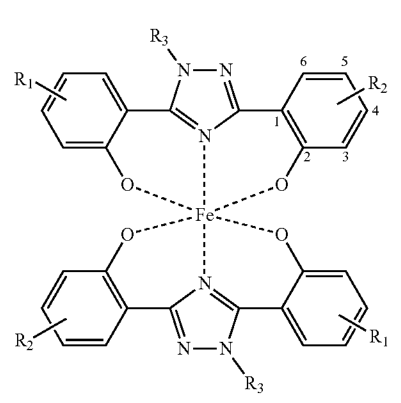

wherein:

$R_1$ and $R_2$ are both in position 3 or both in position 5 of the aromatic ring and, simultaneously with or independently of each other, they are selected from: H, halogen, $C_1$-$C_5$ alkyl, $C_1$-$C_5$ alkoxyl; and $R_3$ is selected from: H, $C_1$-$C_5$ alkyl, $C_1$-$C_5$ hydroxyalkyl, $C_1$-$C_5$ carboxyalkyl, aryl possibly substituted with at least one group selected from: COOH, halogen, $C_1$-$C_5$ alkyl, $C_1$-$C_5$ alkoxyl, OH, $NZ_2$, $CONZ_2$, wherein Z is simultaneously or independently selected from: H, $C_1$-$C_5$ alkyl; said at least one group preferably being in position 4 of the aromatic ring of said aryl;

with meglumine.

Preferably, $R_1$ and $R_2$ are both in position 3 or both in position 5 of the aromatic ring and, simultaneously with or independently of each other, they are selected from: H, halogen, $C_1$-$C_3$ alkyl, $C_1$-$C_3$ alkoxyl; and $R_3$ is selected from: H, $C_1$-$C_3$ alkyl, $C_1$-$C_3$ hydroxyalkyl, $C_1$-$C_3$ carboxyalkyl, aryl possibly substituted with at least one group selected from: COOH, halogen, $C_1$-$C_3$ alkyl, $C_1$-$C_3$ alkoxyl, OH, $NZ_2$, $CONZ_2$, wherein Z is simultaneously or independently selected from: H, $C_1$-$C_2$ alkyl; said at least one group preferably being in position 4 of the aromatic ring of said aryl.

Preferably, $R_1$ and $R_2$ are both in position 5 of the aromatic ring. Preferably, $R_3$ is an aryl possibly substituted with a group selected from: COOH, halogen, $C_1$-$C_5$ alkyl, preferably $C_1$-$C_3$ alkyl, $C_1$-$C_5$ alkoxyl, preferably $C_1$-$C_3$ alkoxyl, OH, $NZ_2$, $CONZ_2$, wherein Z is simultaneously or independently selected from: H, $C_1$-$C_5$ alkyl, preferably 1-$C_2$ alkyl; said group being in position 4 of the aromatic ring of said aryl. According to one embodiment, said pharmaceutically acceptable salt is obtained from the reaction of an iron complex having the general formula (I) wherein:

$R_1$ and $R_2$ are both in position 3 or both in position 5 of the aromatic ring and, simultaneously, H; and $R_3$ is an aryl substituted with a COOH group in position 4 of the aromatic ring, i.e. an iron complex having the following formula (Ia):

(Ia)

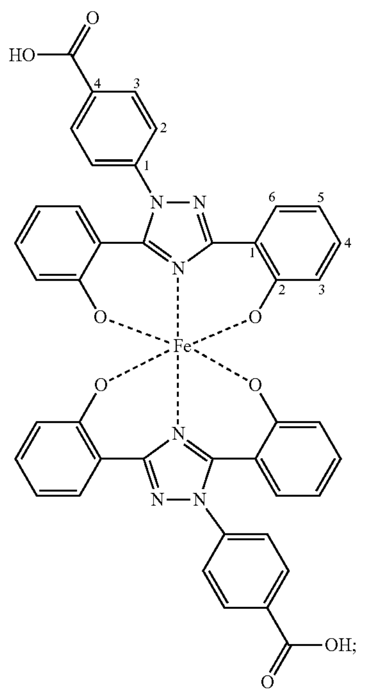

with meglumine.

The present invention also relates to a method for in situ preparation of a pharmaceutical composition as described above comprising the step of mixing:

an iron complex having the general formula (I) or a pharmaceutically acceptable salt thereof;

with one or more excipients, diluents and/or pharmaceutically acceptable media, preferably at the time of oral and/or parenteral administration, said iron complex having the general formula (I) or a pharmaceutically acceptable salt thereof being obtained according to a method comprising the step of mixing, preferably at the time of oral and/or parenteral administration:

(i) a compound having the general formula (II):

(II)

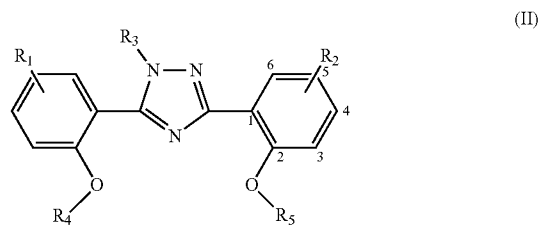

wherein:

$R_1$ and $R_2$ are both in position 3 or both in position 5 of the aromatic ring and, simultaneously with or independently of each other, they are selected from: H, halogen, $C_1$-$C_5$ alkyl, preferably $C_1$-$C_3$ alkyl, $C_1$-$C_5$ alkoxyl, preferably $C_1$-$C_3$ alkoxyl; $R_3$ is selected from: H, $C_1$-$C_5$ alkyl, preferably $C_1$-$C_3$ alkyl, $C_1$-$C_5$ hydroxyalkyl, preferably $C_1$-$C_3$ hydroxyalkyl, $C_1$-$C_5$ carboxyalkyl, preferably $C_1$-$C_3$ carboxyalkyl, aryl possibly substituted with at least one group selected from: COOH, halogen, $C_1$-$C_5$ alkyl, preferably $C_1$-$C_3$ alkyl, $C_1$-$C_5$ alkoxyl, preferably $C_1$-$C_3$alkoxyl, OH, $NZ_2$, $CONZ_2$, wherein Z is simultaneously or independently selected from: H, $C_1$-$C_5$ alkyl, preferably $C_1$-$C_2$ alkyl; said at least one group preferably being in position 4 of the aromatic ring of said aryl; $R_4$ and $R_5$, simultaneously with or independently of each other, are selected from: H, $C_1$-$C_4$ alkanoyl or aroyl possibly substituted with at least one group selected from: COOH, $C_1$-$C_2$ alkyl, $C_1$-$C_2$ alkoxyl, OH; said at least one group preferably being in position 4 of the aromatic ring of said aroyl;

with (ii) an iron compound capable of providing Fe(III) ions, preferably selected in the group consisting of: iron oxide, iron hydroxide, iron chloride, iron sulphate, iron citrate, iron fumarate, iron gluconate, iron tartrate, iron ammonium sulphate, iron carbonate; until forming an iron complex having the general formula (I);

or with (iii) an inorganic or organic base preferably selected in the group consisting of: a salt of an alkali metal or alkaline earth metal, an amine, an amino alcohol, said amino alcohol preferably being selected in the group consisting of: tris(hydroxymethyl)aminomethane, glucosamine, glucamine, N-methylglucamine (meglumine), until forming a pharmaceutically acceptable salt of the compound having the general formula (II), and subsequently mixing with an iron compound capable of providing Fe(III) ions, preferably selected in the group consisting of iron oxide, iron hydroxide, iron chloride, iron sulphate, iron citrate, iron fumarate, iron gluconate, iron tartrate, iron ammonium sulphate, iron carbonate, until forming a pharmaceutically acceptable salt of the iron complex having the general formula (I). Preferably, $R_1$ and $R_2$ are both in position 3 or both in position 5 of the aromatic ring and, simultaneously with or independently of each other, they are selected from: H, halogen, $C_1$-$C_3$ alkyl, $C_1$-$C_3$ alkoxyl; and $R_3$ is selected from: H, $C_1$-$C_3$ alkyl, $C_1$-$C_3$ hydroxyalkyl, $C_1$-$C_3$ carboxyalkyl, aryl possibly substituted with at least one group selected from: COOH, halogen, $C_1$-$C_3$ alkyl, $C_1$-$C_3$ alkoxyl, OH, $NZ_2$, $CONZ_2$, wherein Z is simultaneously or independently selected from: H, $C_1$-$C_2$ alkyl; said at least one group preferably being in position 4 of the aromatic ring of said aryl.

Preferably, $R_1$ and $R_2$ are both in position 5 of the aromatic ring. Preferably, $R_3$ is an aryl possibly substituted with a group selected from: COOH, halogen, $C_1$-$C_5$ alkyl, preferably 01-$C_3$ alkyl, $C_1$-$C_5$ alkoxyl, preferably $C_1$-$C_3$ alkoxyl, OH, $NZ_2$, $CONZ_2$, wherein Z is simultaneously or independently selected from: H, $C_1$-$C_5$ alkyl, preferably $C_1$-$C_2$ alkyl; said group being in position 4 of the aromatic ring of said aryl. The present invention also relates to a method for in situ preparation of a pharmaceutically acceptable salt of a complex having the general formula (I) with meglumine as described above, said method comprising the step of mixing, preferably at the time of oral and/or parenteral administration:

(i) a compound having the general formula (II)

(II)

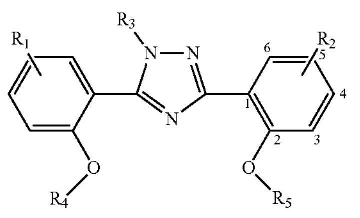

wherein:

$R_1$ and $R_2$ are both in position 3 or both in position 5 of the aromatic ring and, simultaneously with or independently of each other, they are selected from: H, halogen, $C_1$-$C_5$ alkyl, preferably $C_1$-$C_3$ alkyl, $C_1$-$C_5$ alkoxyl, preferably $C_1$-$C_3$ alkoxyl; $R_3$ is selected from: H, $C_1$-$C_5$ alkyl, preferably $C_1$-$C_3$ alkyl, $C_1$-$C_5$ hydroxyalkyl, preferably $C_1$-$C_3$ hydroxyalkyl, $C_1$-$C_5$ carboxyalkyl, preferably $C_1$-$C_3$ carboxyalkyl, aryl possibly substituted with at least one group selected from: COOH, halogen, $C_1$-$C_5$ alkyl, preferably $C_1$-$C_3$ alkyl, $C_1$-$C_5$ alkoxyl, preferably $C_1$-$C_3$ alkoxyl, OH, $NZ_2$, $CONZ_2$, wherein Z is simultaneously or independently selected from: H, $C_1$-$C_5$ alkyl, preferably $C_1$-$C_2$alkyl; said at least one group preferably being in position 4 of the aromatic ring of said aryl; Ra and $R_5$, simultaneously with or independently of each other, are selected from: H, $C_1$-$C_4$ alkanoyl or aroyl possibly substituted with at least one group selected from: COOH, $C_1$-$C_2$ alkyl, $C_1$-$C_2$ alkoxyl, OH; said at least one group preferably being in position 4 of the aromatic ring of said aroyl;

with (iii) N-methylglucamine (meglumine), until forming a pharmaceutically acceptable salt of the compound having the general formula (II), and subsequently mixing with an iron compound capable of providing Fe(III) ions, preferably selected in the group consisting of iron oxide, iron hydroxide, iron chloride, iron sulphate, iron citrate, iron fumarate, iron gluconate, iron tartrate, iron ammonium sulphate, iron carbonate, until forming a pharmaceutically acceptable salt of the iron complex having the general formula (I). Preferably, $R_1$ and $R_2$ are both in position 3 or both in position 5 of the aromatic ring and, simultaneously with or independently of each other, they are selected from: H, halogen, $C_1$-$C_3$ alkyl, $C_1$-$C_3$ alkoxyl; and $R_3$ is selected from: H, $C_1$-$C_3$ alkyl, $C_1$-$C_3$ hydroxyalkyl, $C_1$-$C_3$ carboxyalkyl, aryl possibly substituted with at least one group selected from: COOH, halogen, $C_1$-$C_3$ alkyl, $C_1$-$C_3$ alkoxyl, OH, $NZ_2$, $CONZ_2$, wherein Z is simultaneously or independently selected from: H, $C_1$-$C_2$ alkyl; said at least one group preferably being in position 4 of the aromatic ring of said aryl. Preferably, $R_1$ and $R_2$ are both in position 5 of the aromatic ring. Preferably, $R_3$ is an aryl possibly substituted with a group selected from: COOH, halogen, $C_1$-$C_5$ alkyl, preferably $C_1$-$C_3$ alkyl, $C_1$-$C_5$ alkoxyl, preferably $C_1$-$C_3$ alkoxyl, OH, $NZ_2$, $CONZ_2$, wherein Z is simultaneously or independently selected from: H, $C_1$-$C_5$ alkyl, preferably $C_1$-$C_2$ alkyl; said group being in position 4 of the aromatic ring of said aryl. The present invention also relates to a method for in situ preparation of a pharmaceutically acceptable salt of the iron complex having the formula (Ia) with meglumine, said method comprising the step of mixing, preferably at the time of oral and/or parenteral administration:

(i) a compound having the general formula (II)

(II)

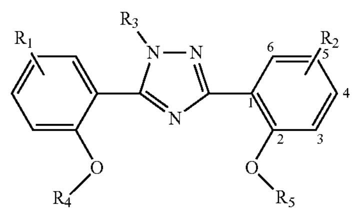

wherein:

$R_1$ and $R_2$ are both in position 3 or both in position 5 and are simultaneously with H; and $R_3$ is an aryl substituted with a COOH group in position 4 of the aromatic ring; $R_4$ and $R_5$, simultaneously with or independently of each other, are selected from: H, alkanoyl or aroyl possibly substituted with at least one group selected from: COOH, $C_1$-$C_2$ alkoxyl, OH; said at least one group preferably being in position 4 of the aromatic ring of said aroyl;

with (iii) N-methylglucamine (meglumine), until forming a pharmaceutically acceptable salt of the compound having the general formula (II), and subsequently mixing with an iron compound capable of providing Fe(III) ions, preferably selected in the group consisting of iron oxide, iron hydroxide, iron chloride, iron sulphate, iron citrate, iron fumarate, iron gluconate, iron tartrate, iron ammonium sulphate, iron carbonate, until forming a pharmaceutically acceptable salt of the iron complex having the formula (Ia).

The present invention also relates to a kit for in situ preparation of an iron complex having the general formula (I):

(I)

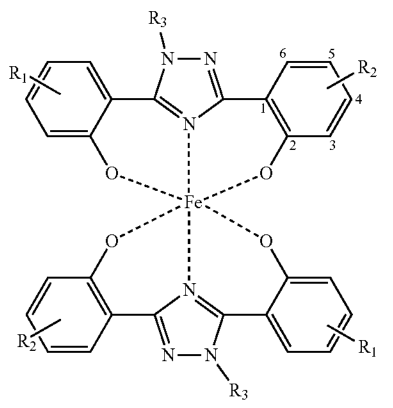

or a pharmaceutically acceptable salt thereof, wherein:

$R_1$ and $R_2$ are both in position 3 or both in position 5 of the aromatic ring and, simultaneously with or independently of each other, they are selected from: H, halogen, $C_1$-$C_5$ alkyl, $C_1$-$C_5$ alkoxyl; and $R_3$ is selected from: H, $C_1$-$C_5$ alkyl, $C_1$-$C_5$ hydroxyalkyl, $C_1$-$C_5$ carboxyalkyl, aryl possibly substituted with at least one group selected from: COOH, halogen, $C_1$-$C_5$ alkyl, $C_1$-$C_5$ alkoxyl, OH, $NZ_2$, $CONZ_2$, wherein Z is simultaneously or independently selected from: H, $C_1$-$C_5$ alkyl; said at least one group preferably being in position 4 of the aromatic ring of said aryl;

according to a method comprising the step of mixing, preferably at the time of oral and/or parenteral administration:

(i) a compound having the general formula (II):

(II)

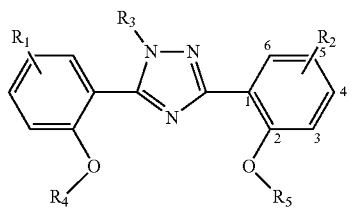

wherein:

$R_1$ and $R_2$ are both in position 3 or both in position 5 of the aromatic ring and, simultaneously with or independently of each other, they are selected from: H, halogen, $C_1$-$C_5$ alkyl, preferably $C_1$-$C_3$ alkyl, $C_1$-$C_5$ alkoxyl, preferably $C_1$-$C_3$ alkoxyl; $R_3$ is selected from: H, $C_1$-$C_5$ alkyl, preferably $C_1$-$C_3$ alkyl, $C_1$-$C_5$ hydroxyalkyl, preferably $C_1$-$C_3$ hydroxyalkyl, $C_1$-$C_5$ carboxyalkyl, preferably $C_1$-$C_3$ carboxyalkyl, aryl possibly substituted with at least one group selected from: COOH, halogen, $C_1$-$C_5$ alkyl, preferably $C_1$-$C_3$ alkyl, $C_1$-$C_5$ alkoxyl, preferably $C_1$-$C_3$ alkoxyl, OH, $NZ_2$, $CONZ_2$, wherein Z is simultaneously or independently selected from: H, $C_1$-$C_5$ alkyl, preferably $C_1$-$C_2$ alkyl; said at least one group preferably being in position 4 of the aromatic ring of said aryl; $R_4$ and $R_5$, simultaneously with or independently of each other, are selected from: H, $C_1$-$C_4$ alkanoyl or aroyl possibly substituted with at least one group selected from: COOH, $C_1$-$C_2$ alkyl, $C_1$-$C_2$ alkoxyl, OH; said at least one group preferably being in position 4 of the aromatic ring of said aroyl;

with (ii) an iron compound capable of providing Fe(III) ions, preferably selected in the group consisting of: iron oxide, iron hydroxide, iron chloride, iron sulphate, iron citrate, iron fumarate, iron gluconate, iron tartrate, iron ammonium sulphate, iron carbonate; until forming an iron complex having the general formula (I);

or with (iii) an inorganic or organic base preferably selected in the group consisting of: a salt of an alkali metal or alkaline earth metal, an amine, an amino alcohol, said amino alcohol preferably being selected in the group consisting of: tris(hydroxymethyl)aminomethane, glucosamine, glucamine, N-methylglucamine (meglumine), until forming a pharmaceutically acceptable salt of the compound having the general formula (II), and subsequently mixing with an iron compound capable of providing Fe(III) ions, preferably selected in the group consisting of iron oxide, iron hydroxide, iron chloride, iron sulphate, iron citrate, iron fumarate, iron gluconate, iron tartrate, iron ammonium sulphate, iron carbonate, until forming a pharmaceutically acceptable salt of the iron complex having the general formula (I); said kit comprising at least two separate containers wherein:

(i) a first container comprises a compound having the general formula (II); and (ii) a second container comprises an iron compound.

Preferably, $R_1$ and $R_2$ are both in position 3 or both in position 5 of the aromatic ring and, simultaneously with or independently of each other, they are selected from: H, halogen, $C_1$-$C_3$ alkyl, $C_1$-$C_3$ alkoxyl; and $R_3$ is selected from: H, $C_1$-$C_3$ alkyl, $C_1$-$C_3$ hydroxyalkyl, $C_1$-$C_3$ carboxyalkyl, aryl possibly substituted with at least one group selected from: COOH, halogen, $C_1$-$C_3$ alkyl, $C_1$-$C_3$ alkoxyl, OH, $NZ_2$, $CONZ_2$, wherein Z is simultaneously or independently selected from: H, $C_1$-$C_2$ alkyl; said at least one group preferably being in position 4 of the aromatic ring of said aryl. Preferably, $R_1$ and $R_2$ are both in position 5 of the aromatic ring. Preferably, $R_3$ is an aryl possibly substituted with a group selected from: COOH, halogen, $C_1$-$C_5$ alkyl, preferably $C_1$-$C_3$ alkyl, $C_1$-$C_5$ alkoxyl, preferably $C_1$-$C_3$ alkoxyl, OH, $NZ_2$, $CONZ_2$, wherein Z is simultaneously or independently selected from: H, $C_1$-$C_5$ alkyl, preferably $C_1$-$C_2$ alkyl; said group being in position 4 of the aromatic ring of said aryl. According to a particularly preferred embodiment, the iron complex, is an iron complex having the general formula (I) wherein R; and $R_2$ are both in position 3 or both in position 5 of the aromatic ring and, simultaneously with H; and $R_3$ is an aryl substituted with a COOH group in position 4 of the aromatic ring, i.e. it is an iron complex having the following formula (Ia):

(Ia)

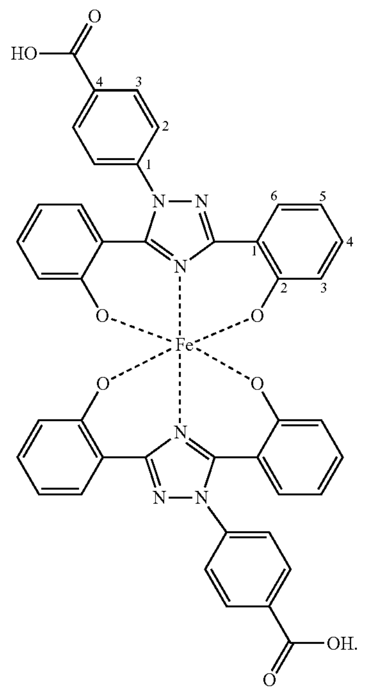

The present invention also relates to a kit comprising one or more excipients, diluents and/or pharmaceutically acceptable media for the preparation of a pharmaceutical composition as described above, said one or more excipients, diluents and/or pharmaceutically acceptable media being contained in at least one of the two separate containers (i)-(ii);

or else said kit comprising at least three separate containers wherein:

(i) a first container comprises a compound having the general formula (II);

(ii) a second container comprises an iron compound; and (iii) a third container comprises an inorganic or organic base;

said kit comprising optionally one or more excipients, diluents and/or pharmaceutically acceptable media for the preparation of a pharmaceutical composition according to the present invention, as previously described, said one or more excipients, diluents and/or pharmaceutically acceptable media being contained in at least one of the three separate containers (i)-(iii).

EXAMPLES

Example 1—Preparation of the Meglumine Salt of $Fe(Dfx)_2$

The $[Fe(DFX)_2Meg_3]$ complex was prepared according to the following steps. 0.2 mmol of DFX (PM=373.73; 75 mg) were dispersed in 100 mL of $H_2O$ and the suspension thus obtained was basified with a 5 M aqueous solution of meglumine (N-methyl-D-glucamine, MEG), by heating and stirring until complete dissolution and obtainment of a pH of about 9. 0.1 mmol of $FeCl_3$ (4 mL of a solution 25 mM) were then added and the pH of the solution thus obtained was brought to about 8 by adding a 5 M solution of meglumine. The solution obtained was heated to 60° C. and kept under stirring for 1 hour. The solution was then filtered over a Buchner filter and lyophilised; a red solid was obtained. The complex obtained was analytically characterised by means of the HPLC-Waters Alliance Separation Module with a 2998 FDA detector. The analysis was performed with a 10-minute isocratic solution; flow 1 mL/min; injection volume: 10 μL of a 200 μM solution; column: AtlantisRPC18; eluent: 35% buffer (50 mM ammonium acetate, 10 mM tetrabutylammonium hydrogen sulphate) 45% methanol and 20% acetonitrile; wavelength 467 nm; $t_R$=2.7 min. The presence of the complex was confirmed by mass spectroscopy using the Waters 3100 Mass Detector system with ESI ionisation (−) by means of a syringe pump (direct infusion) and with a 2:1 water/methanol eluent. The analysis of peaks in the mass spectrum (m/z=798.3 and m/z 398.8) corresponds with the theoretical mass of the complex $C_{42}H_{27}FeN_6O_8$ m/z=M·H/1=798.13, m/z=M·2H/2=398.6

The salified complex thus obtained (hereinafter indicated simply as $Fe(DFX)_2$) was subject to different experimental tests and trials, illustrated in the following examples, to prove its effectiveness as a contrast agent for MRI.

Example 2-Fixed-Field Relaxometric Measurements (1T): Comparison with the Prior Art Gd-DTPA and Fe-DTPA Complexes Fixed-field relaxometric measurements were performed using the $[Fe(DFX)_2Meg_3]$ complex obtained as per Example 1, comparing it with two prior art complexes, Gd-DTPA and Fe-DTPA. The results obtained for the measurements in human serum and in water are shown in Table 1 below.

TABLE 1

| | Human serum | | water | |
|---|---|---|---|---|
| | $r_{1p}$ | $r_{2p}$ | $r_{1p}$ | $r_{2p}$ |
| Gd-DTPA | 4.1 (1 T, 37° C.) | 4.8 (1 T, 37° C.) | 3.4 (1 T, 37° C.) | 3.9 (1 T, 37° C.) |
| Fe-DTPA | 0.9 (0.94 T, 37° C.) | 0.9 (0.94 T, 37° C.) | 0.6 (0.94 T, 37° C.) | 0.6 (0.94 T, 37° C.) |
| $Fe(DFX)_2Meg_3$ | 4.4 (1 T, 25° C.) | 6.4 (1 T, 25° C.) | 2.3 (1 T, 25° C.) | 3.1 (1 T, 25° C.) |
| | 4.1 (1 T, 37° C.) | | 1.5 (1 T, 37° C.) | |

Example 3—$1/T_1$ $^1$H-NMRD Profiles of $Fe(DFX)_{0.2}$

As shown in FIG. 1, an analysis was conducted of the $1/T_1$ (R1)$^1$H-NMRD profiles tor the $Fe(DFX)_2$ complex obtained as per Example, in water and in human serum at 25° C., in the range of Larmor frequencies comprised between 0.01 and 80 MHz. and the $1/T_2$ (R2) profiles in the range of Larmor frequencies between 20 and 80 MHz. The $1/T_1$ (R1) profiles recorded in water and in serum coincide up to a frequency of about 10 MHz; then, for the profile recorded in serum, a progressive increase in relaxivity was observed that was much more pronounced than in the case of the complex in water. This phenomenon is attributable to the fact that, in serum, the complex binds to albumin, with a consequent increase in the dimensions of the system and hence of the molecular reorientation time ($\pi_R$). As expected, the $1/T_2$ values are always higher than the $1/T_1$ values across the whole range of frequencies investigated (20-80 MHz). The R2/R1 ratio is maintained around a value of about 1.4 both in water and in human serum.

Example 4—Measurements of Stability and Relaxivity with Changes in pH

Figure 2:
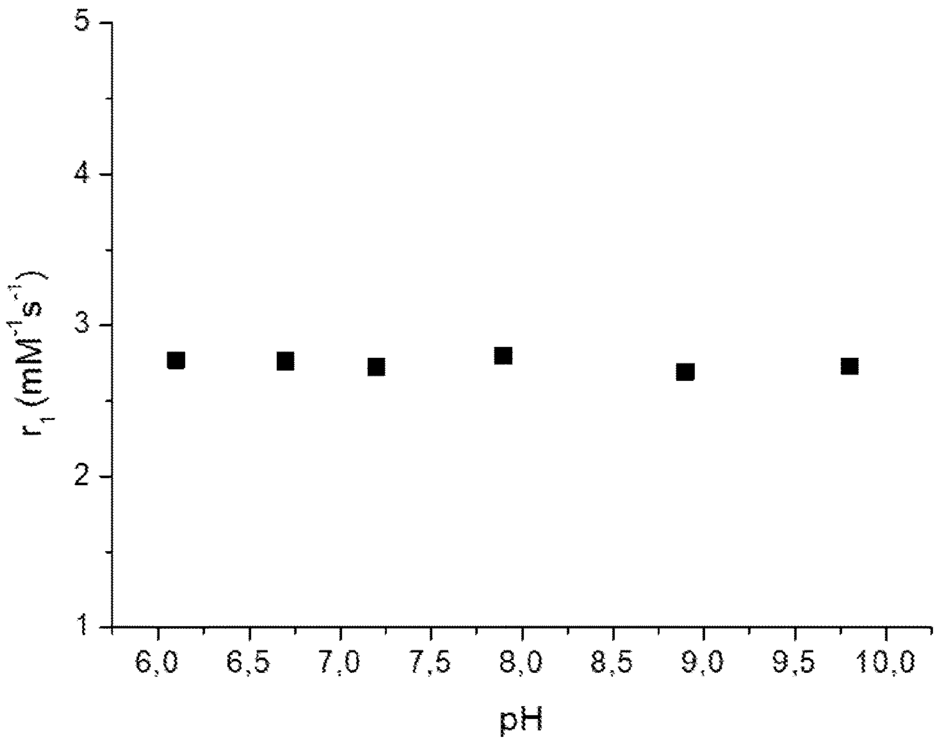
FIG. 2 shows the trend in the relaxivity ($r_{1p}$) of the $Fe(DFX)_2$ complex according to the present invention, in $H_2O$, with changes in pH and under a fixed magnetic field ($B_0$=0.5T).

The stability of the $Fe(DFX)_2$ complex obtained as per Example 1 was tested in water with changes in the pH. The complex of the invention, dissolved in water, shows to be stable (no precipitation phenomena were recorded) in the investigated pH range (from 6 to 10). Furthermore, as shown in FIG. 2, its relaxivity, measured with a fixed magnetic field ($B_0$=0.5 T), shows to be constant in the investigated pH range (from 6 to 10), suggesting that no structural changes occur which might modify the relaxivity.

Example 5—Measurements of Relaxation Rate with Changes in Temperature

Figure 3:
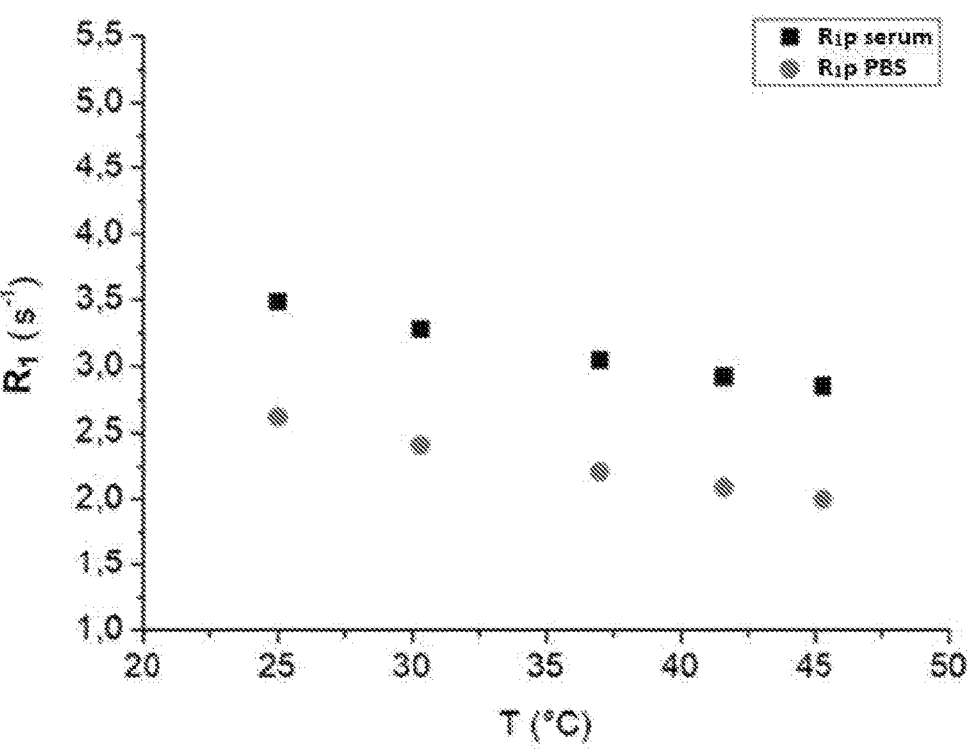
FIG. 3 shows the trend in the relaxation rate ($R_{1p}$) of the $Fe(DFX)_2$ complex according to the present invention, in PBS and human serum, with changes in temperature and under a fixed magnetic field ($B_{0=0.5}$T).

The increase in the relaxation rate $R_1$ of solutions of the $Fe(DFX)_2$ complex obtained as per Example 1 was measured both in PBS (phosphate buffered saline) and in serum, under a fixed magnetic field ($B_0$=0.5 T), with changes in temperature. As may be observed in FIG. 3, both in serum and in PBS, the value of $R_1$ decreases progressively as the temperature increases. This trend is attributable to the fact that the increase in temperature causes a shortening of the correlation times in paramagnetic relaxation, with a consequent decrease in the value of $R_1$.

Example 6—Study of Stability in Human Serum

Figure 4:
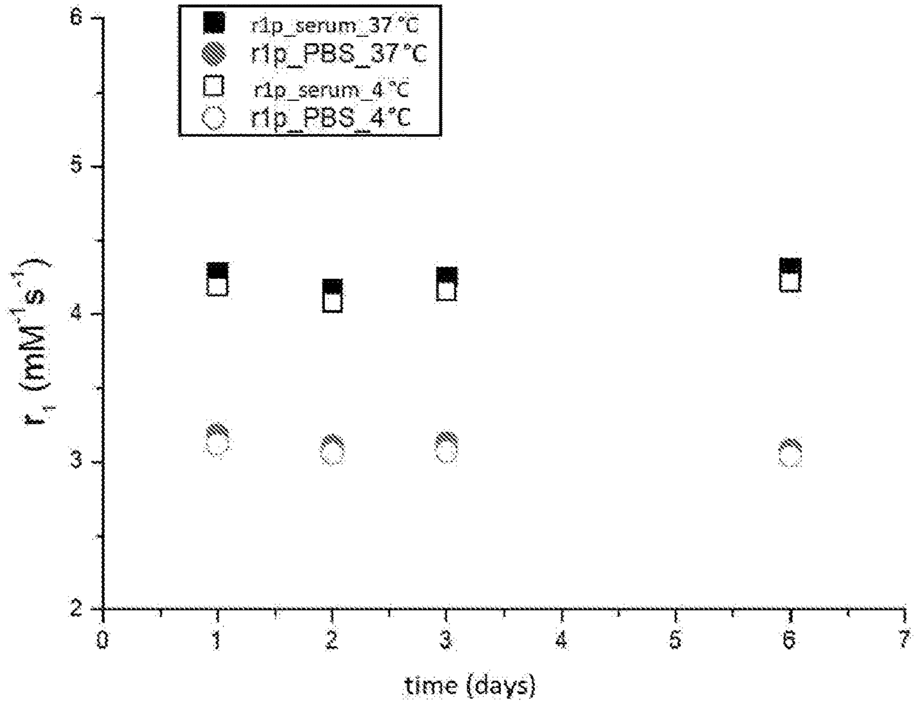
FIG. 4 shows the trend in relaxivity ($r_{1p}$), as a function of time, of the $Fe(DFX)_2$ complex according to the present invention, in PBS and human serum, measured under a fixed magnetic field ($B_0$=0.5T) and at a temperature of 25° C., in samples maintained at two different temperatures (37° C. and 4° C.) up to 6 days.

The study of the stability of the $Fe(DFX)_2$ complex according to the present invention, obtained as per Example 1, in serum was performed by measuring the relaxivity, at 0.5T and 25° C., of solutions maintained at 4° C. and 37° C. up to 6 days after preparation. The values obtained were compared with those obtained for analogous tests performed in PBS. As shown in FIG. 4, a substantial constancy of the values of $r_1$ was observed in the case both of solutions maintained at 4 CC and at 37° C. It is thus possible to conclude that the $Fe(DFX)_2$ complex is stable in PBS and in serum at the investigated temperatures and times.

Example 7 Binding onto Albumin

Figure 5:
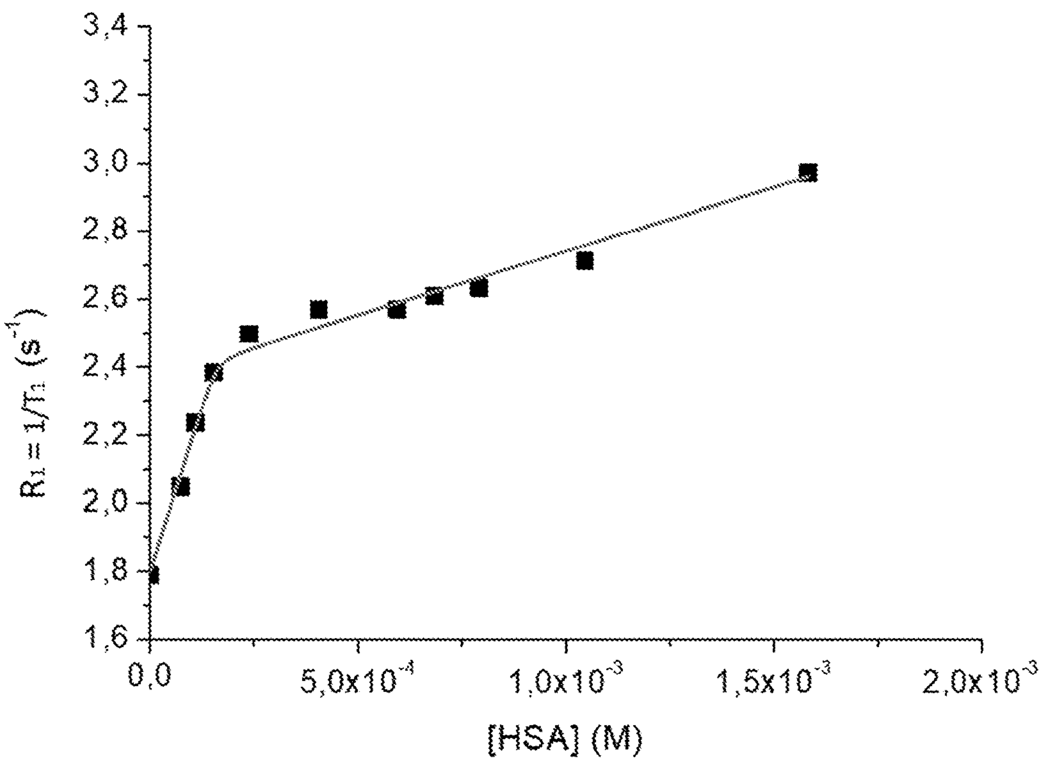
FIG. 5 shows the trend in the relaxation time of water protons ($R_1=1/T_1$) of an aqueous solution containing $Fe(DFX)_2$ in a concentration of 0.5 mM and increasing concentrations of albumin of human serum in PBS.

The binding of the complex according to the present invention $Fe(DFX)_2$, obtained as per Example 1, to the albumin of human blood serum (HSA—human serum albumin) was studied by measuring the value of the relaxation time of the water protons ($R_1=1/T_1$) of solutions containing $Fe(DFX)_2$ in a concentration of 0.5 mM and increasing concentrations of protein (in the range of 0.07-2.0 mM) in PBS. The trend observed and shown in FIG. 5 is indicative of a strong interaction of $Fe(DFX)_2$ with albumin. A change in the slope of the binding curve occurs at an $Fe(DFX)_2$: albumin ratio of 3:1; it follows that three molecules of $Fe(DFX)_2$ bind to three different sites on the protein. The increase in $R_1$ at albumin concentrations greater than 0.17 mM is attributable to the non-specific bond and the increase in viscosity of the solution.

Figure 6:
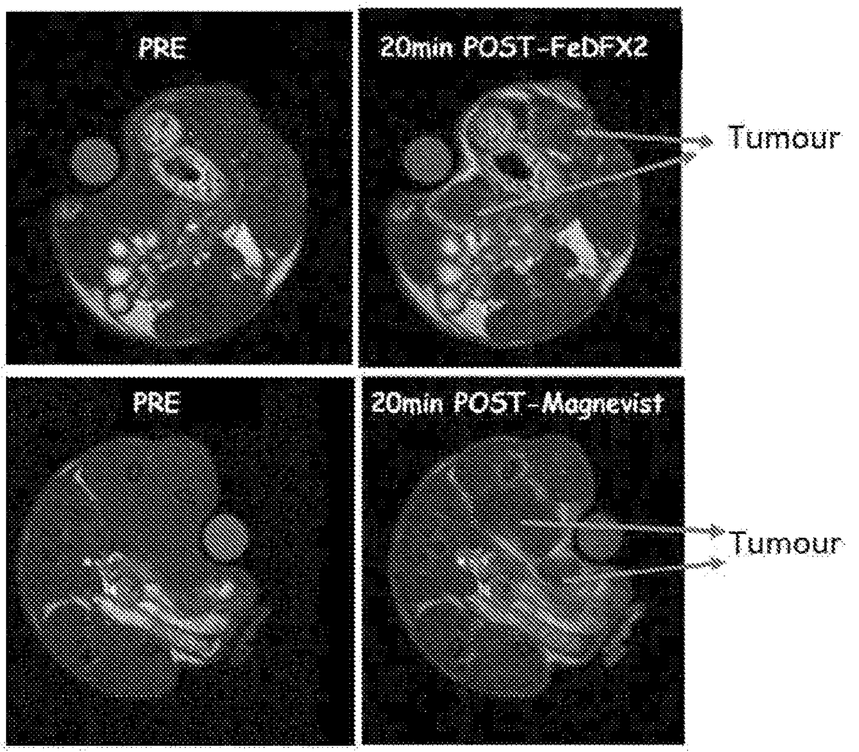
FIG. 6 shows MRI images recorded in vivo under a fixed magnetic field of 71, in mice inoculated with tumour cells (ISA), before and 20 minutes after administration of a 0.1 mmol/kg dose of $Fe(DFX)_2$ and Gd-DTPA (Magnevist).
Figure 7:
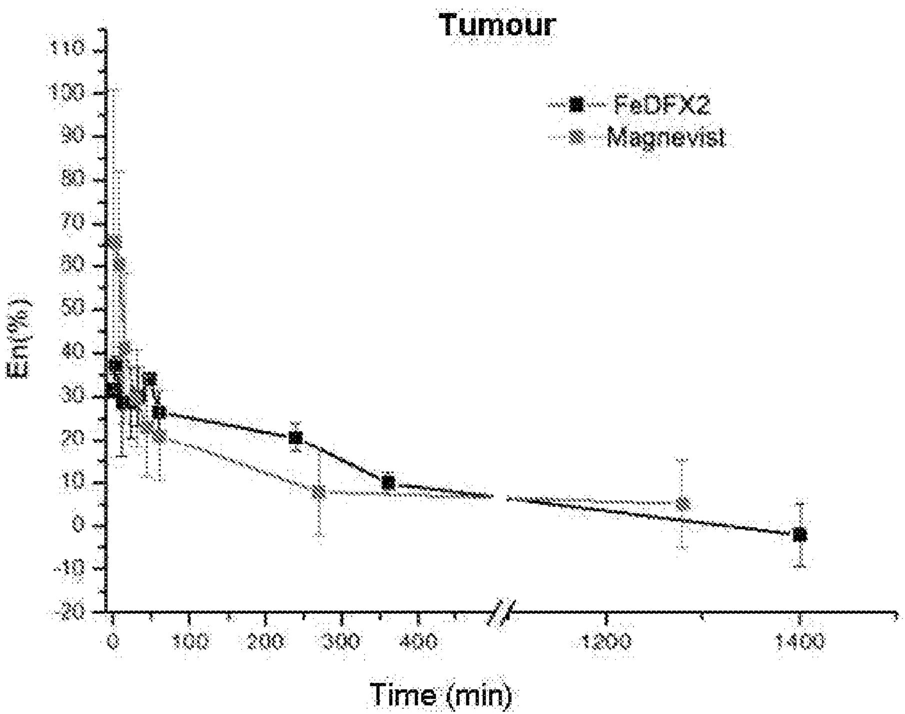
FIG. 7 shows the percentage increase in contrast (En %) in the tumour region, recorded in vivo under a fixed magnetic field of 71, in mice inoculated with tumour cells (ISA), as a function of time following administration of a 0.1 mmol/kg dose of $Fe(DFX)_2$ and Gd-DTPA (Magnevist).
Figure 7A:
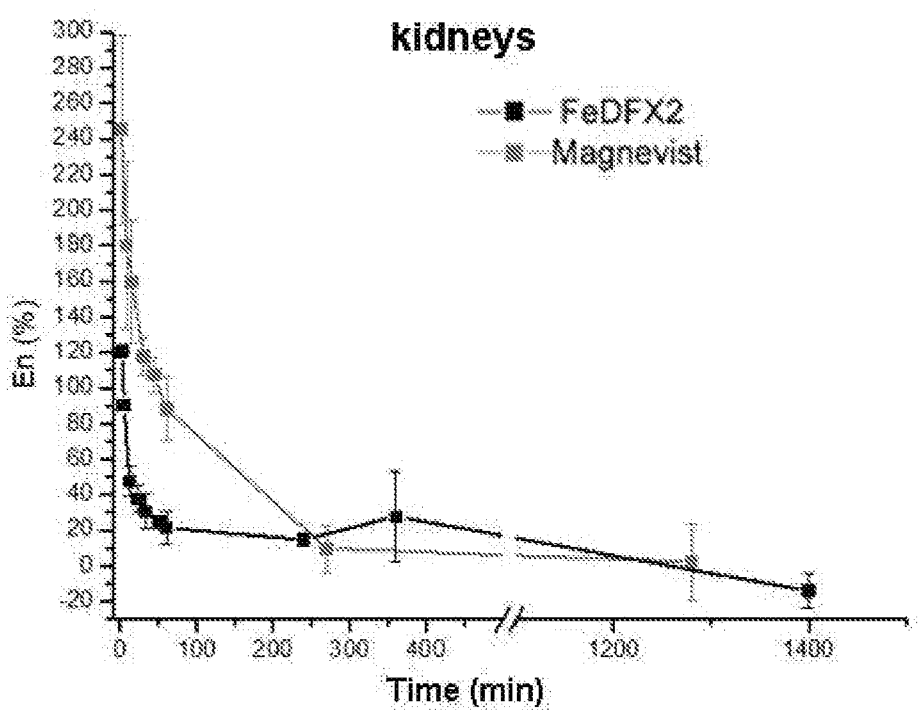
FIG. 7*a* shows the percentage increase in contrast (En %) in kidneys, recorded in vivo under a fixed magnetic field of 71, in mice inoculated with tumour cells (ISA), as a function of time following administration of a 0.1 mmol/kg dose of $Fe(DFX)_2$ and Gd-DTPA (Magnevist).
Figure 7B:
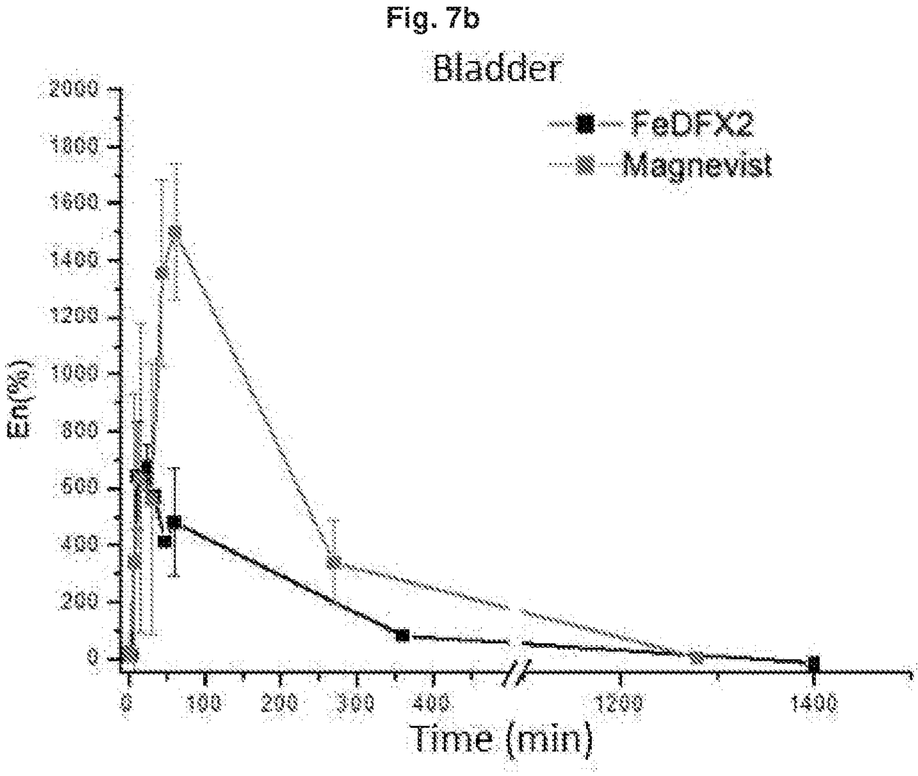
FIG. 7*b* shows the percentage increase in contrast (En %) in the bladder, recorded in vivo under a fixed magnetic field of 71, in mice inoculated with tumour cells (ISA), as a function of time following administration of a 0.1 mmol/kg dose of $Fe(DFX)_2$ and Gd-DTPA (Magnevist).
Figure 7C:
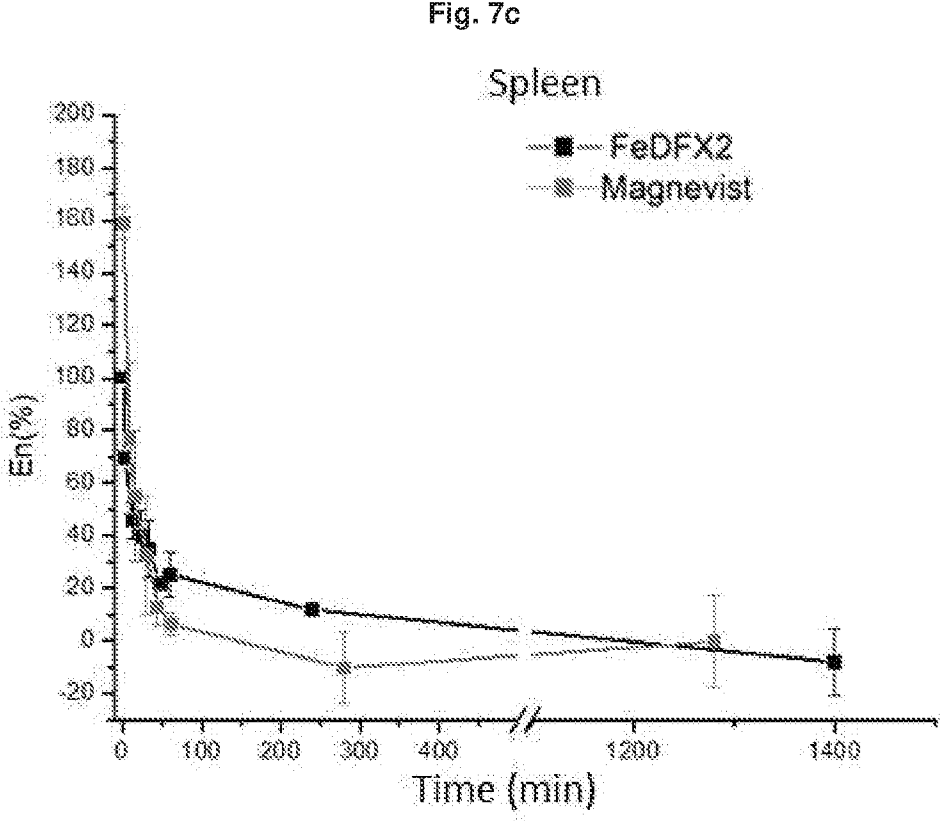
FIG. 7*c* shows the percentage increase in contrast (En %) in the spleen, recorded in vivo under a fixed magnetic field of 71, in mice inoculated with tumour cells (ISA), as a function of time following administration of a 0.1 mmol/kg dose of $Fe(DFX)_2$ and Gd-DTPA (Magnevist).
Figure 8:
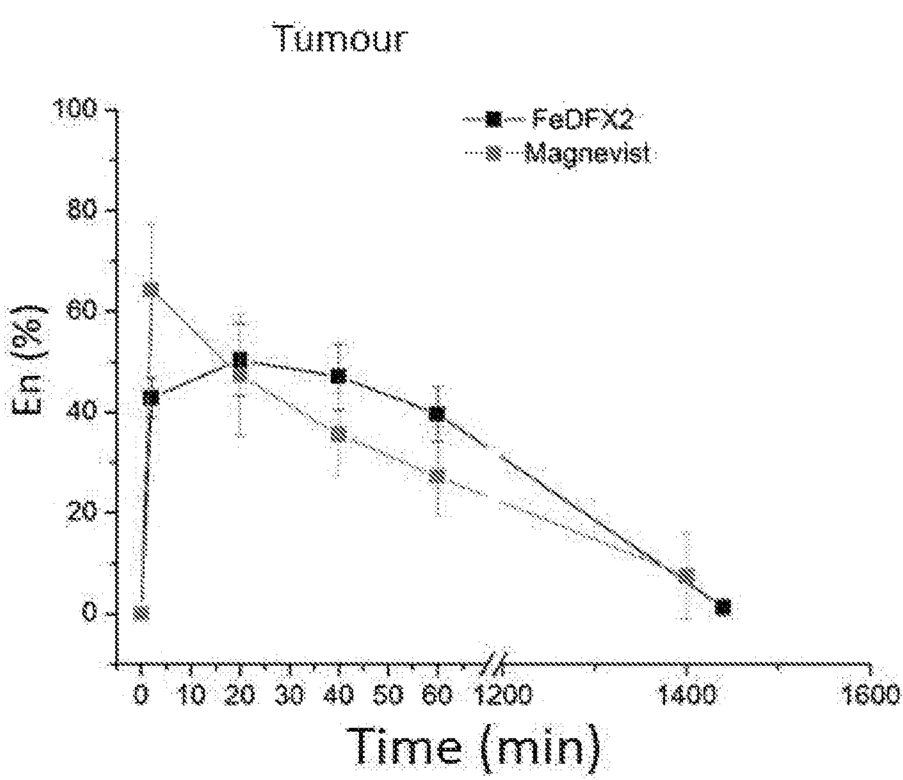
FIG. 8 shows the percentage increase in contrast (En %) in the tumour region, recorded in vivo under a fixed magnetic field of 31, in mice inoculated with tumour cells (ISA), as a function of time following administration of a 0.1 mmol/kg dose of $Fe(DFX)_2$ and Gd-DTPA (Magnevist).
Figure 8A:
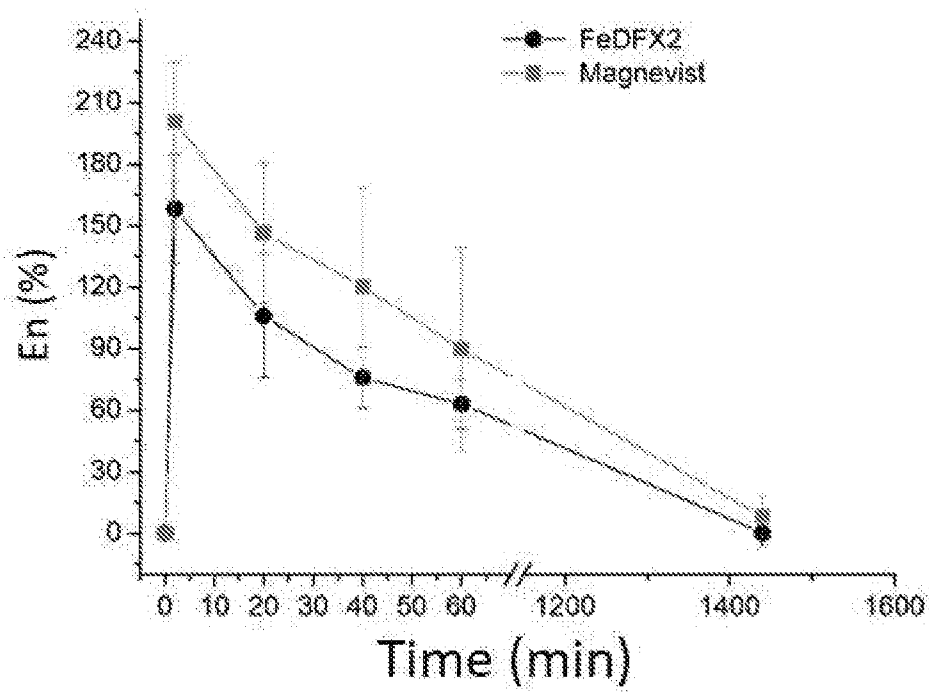
FIG. 8*a* shows the percentage increase in contrast (En %) in kidneys, recorded in vivo under a fixed magnetic field of 3T, in mice inoculated with tumour cells (ISA), as a function of time following administration of a 0.1 mmol/kg dose of $Fe(DFX)_2$ and Gd-DTPA (Magnevist).
Figure 8B:
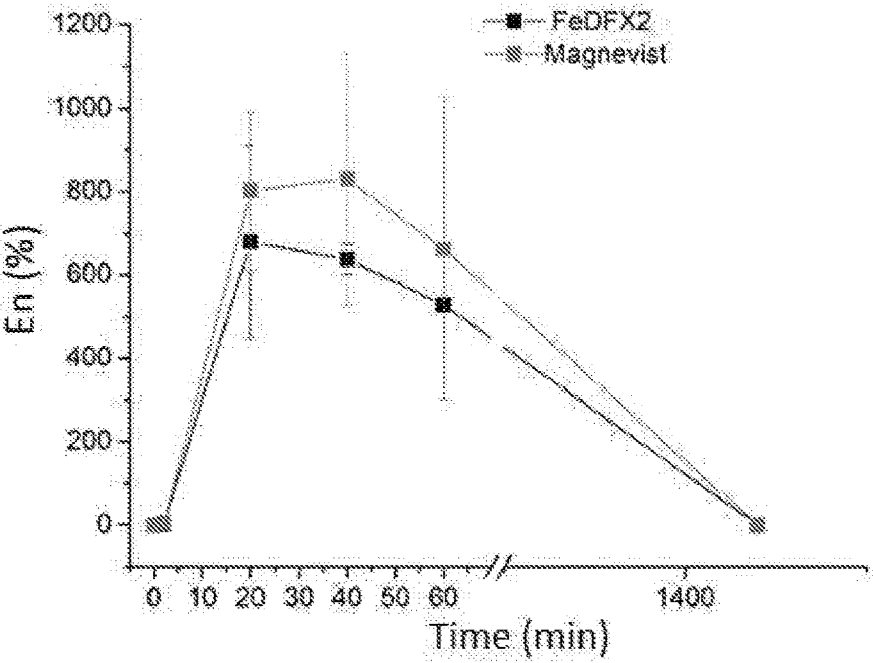
FIG. 8*b* shows the percentage increase in contrast (En %) in the bladder, recorded in vivo under a fixed magnetic field of 3T, in mice inoculated with tumour cells (TSA), as a function of time following administration of a 0.1 mmol/kg dose of $Fe(DFX)_2$ and Gd-DTPA (Magnevist).
Figure 8C:
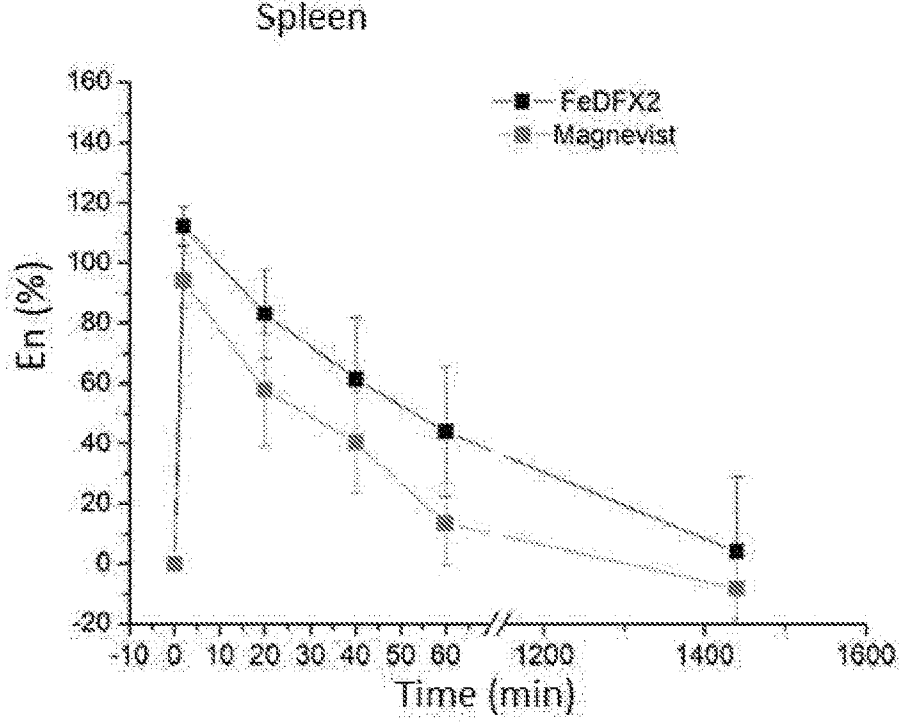
FIG. 8*c* shows the percentage increase in contrast (En %) in the spleen, recorded in vivo under a fixed magnetic field of 3T, in mice inoculated with tumour cells (ISA), as a function of time following administration of a 0.1 mmol/kg dose of $Fe(DFX)_2$ and Gd-DTPA (Magnevist).

Example 8—MRI Images with $Fe(DFX)_2$ and Comparison with the Prior Art Gd-DTPA Complex The increase in contrast (En %) generated by the administration of the complex according to the present invention $Fe(DFX)_2$, obtained as per Example 1 (0.1 mmol/Kg), was measured and compared with the one induced by the Gd-DTPA complex (known by the trade name of Magnevist) at the same dose and under the same experimental conditions. The measurements were performed (in vivo), under a fixed magnetic field of 3T and 7T, in mice inoculated with tumour cells (ISA). The images were acquired when the size of the subcutaneous tumour had reached about 1-2 cm (i.e. about 15-20 days after inoculation). As may be inferred from FIGS. 6-8, an overall similarity between the $Fe(DFX)_2$ complex and Gd-DTPA was observed insofar as the contrast induced in the various organs/tissues is concerned. The main differences can be noted in relation to the kidneys and bladder and show a more rapid renal excretion of Gd-DTPA compared to the complex according to the present invention. In the region of the tumour, by contrast, a slower “wash-out” of $Fe(DFX)_2$ was observed compared to Gd-DTPA, demonstrating that the complex according to the invention shows an increase in the MRI signal (En %, “enhancement”) in the tumour region which persists up to 60 minutes after its administration under a fixed magnetic field of both 7T and 3T.

Example 9—Haematic Excretion

Figure 9:
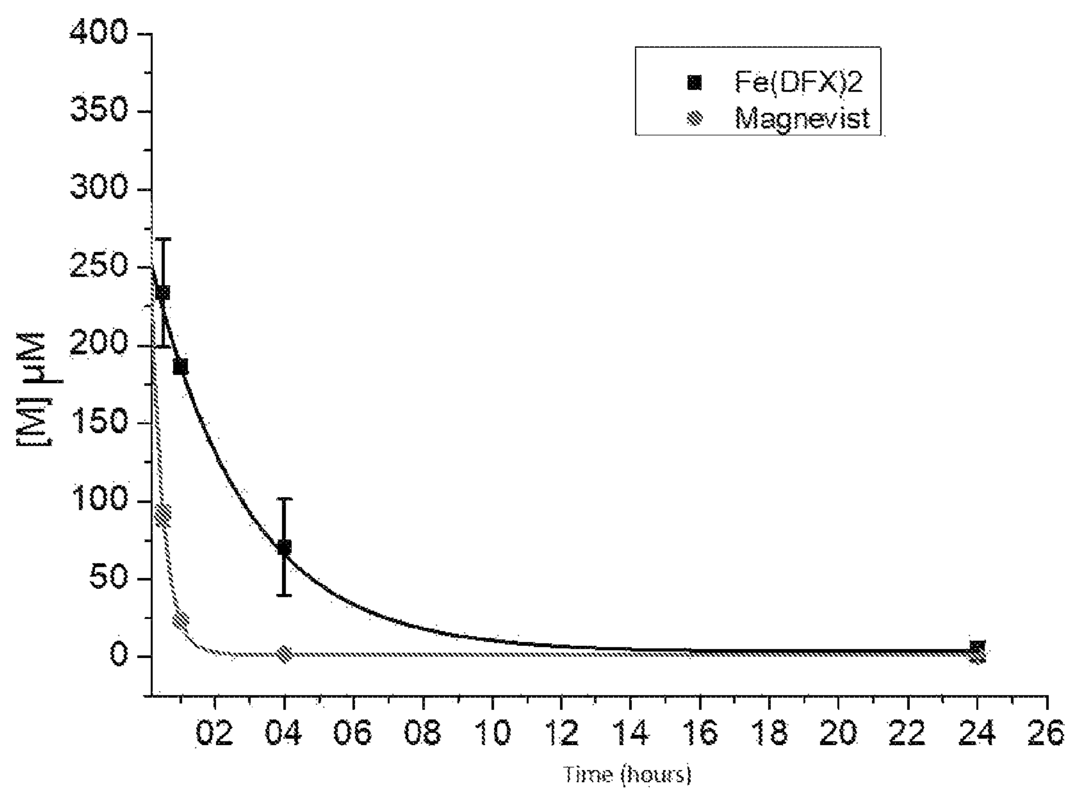
FIG. 9 shows the concentration of $Fe^{3+}$ and $Gd^{3+}$ in plasma as a function of time following administration, to mice, of a 0.1 mmol/kg dose of $Fe(DFX)_2$ and Gd-DTPA (Magnevist).

The concentration of iron ($Fe^{3+}$1 after the values had been corrected for the amount of endogenous iron—or of gadolinium ($Gd^{3+}$) was measured in plasma by ICP-MS as a function of time following the administration of $Fe(DFX)_2$ or Gd-DTPA to mice at a dose of 0.1 mmol/kg. $Fe(DFX)_2$ shows to have a behaviour that can be likened to that of a “blood pool agent”, i.e. a contrast agent for angiography. However, as shown in FIG. 9, 24 hours after administration the concentration of $Fe(DFX)_2$ in the blood shows to be close to a value of zero.

The invention claimed is:

1. A pharmaceutical composition comprising a pharmaceutically acceptable salt of an iron complex having the general formula (I):

(I)

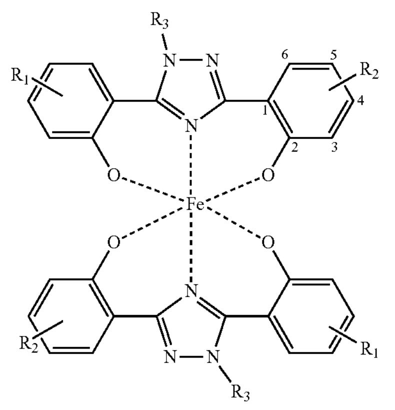

wherein:

$R_1$ and $R_2$ are both in position 3 or both in position 5 of the aromatic ring and, simultaneously with or independently of each other, they are selected from: H, halogen, $C_1$-$C_5$ alkyl, $C_1$-$C_5$ alkoxyl; and $R_3$ is selected from: H, $C_1$-$C_5$ alkyl, $C_1$-$C_5$ hydroxyalkyl, $C_1$-$C_5$ carboxyalkyl, aryl possibly substituted with at least one group selected from: COOH, halogen, $C_1$-$C_5$alkyl, $C_1$-$C_5$ alkoxyl, OH, $NZ_2$, $CONZ_2$, wherein Z is simultaneously or independently selected from: H, $C_1$-$C_5$ alkyl;

and one or more excipients, diluents and/or pharmaceutically acceptable media;

wherein said pharmaceutically acceptable salt is with an inorganic or organic base selected from the group consisting of: a salt of an alkali metal or alkaline earth metal, an amine, and an amino alcohol;

wherein the pharmaceutical composition is formulated for parenteral administration, said pharmaceutical composition being formulated as an aqueous solution.

2. The pharmaceutical composition according to claim 1, wherein:

$R_1$ and $R_2$ are both in position 3 or both in position 5 of the aromatic ring and, simultaneously with or independently of each other, they are selected from: H, halogen, $C_1$-$C_3$ alkyl, $C_1$-$C_3$ alkoxyl; and $R_3$ is selected from: H, $C_1$-$C_3$ alkyl, $C_1$-$C_3$ hydroxyalkyl, $C_1$-$C_3$ carboxyalkyl, aryl possibly substituted with at least one group selected from: COOH, halogen, $C_1$-$C_3$ alkyl, $C_1$-$C_3$ alkoxyl, OH, $NZ_2$, $CONZ_2$, wherein Z is simultaneously or independently selected from: H, $C_1$-$C_2$ alkyl.

3. The pharmaceutical composition according to claim 1, wherein $R_1$ and $R_2$ are both in position 5 of the aromatic ring.

4. The pharmaceutical composition according to claim 1, wherein $R_3$ is an aryl, possibly substituted with a group selected from: COOH, halogen, $C_1$-$C_5$ alkyl, $C_1$-$C_5$ alkoxyl, OH, $NZ_2$, $CONZ_2$, wherein Z is simultaneously or independently selected from: H, $C_1$-$C_5$ alkyl, said group being in position 4 of the aromatic ring of said aryl.

5. The pharmaceutical composition according to claim 1, wherein:

$R_1$ and $R_2$ are both in position 3 or both in position 5 of the aromatic ring and, simultaneously, H;

$R_3$ is an aryl substituted with a COOH group in position 4 of the aromatic ring, said iron complex being an iron complex according to the following formula:

(Ia)

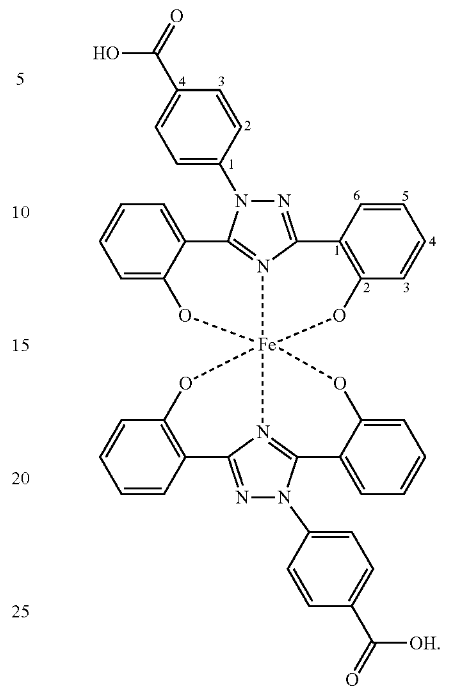

6. The pharmaceutical composition according to claim 1, wherein said pharmaceutically acceptable salt of an iron complex having the general formula (I) is in the form of a racemic or enantiomerically enriched mixture.

7. The pharmaceutical composition according to claim 1, wherein said pharmaceutically acceptable salt is an iron complex having the general formula (I) salified with meglumine.

8. A pharmaceutically acceptable salt of an iron complex having the general formula (I)

(I)

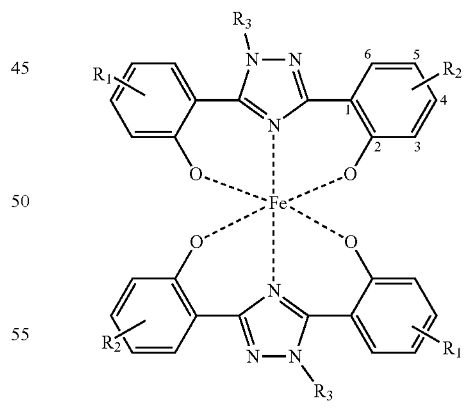

wherein:

$R_1$ and $R_2$ are both in position 3 or both in position 5 of the aromatic ring and, simultaneously with or independently of each other, they are selected from: H, halogen, $C_1$-$C_5$ alkyl, $C_1$-$C_5$ alkoxyl; and $R_3$ is selected from: H, $C_1$-$C_5$ alkyl, $C_1$-$C_5$ hydroxyalkyl, $C_1$-$C_5$ carboxyalkyl, aryl possibly substituted with at least one group selected from: COOH, halogen, $C_1$-$C_5$alkyl, $C_1$-$C_5$ alkoxyl, OH, $NZ_2$, $CONZ_2$, wherein Z is simultaneously or independently selected from: H, $C_1$-$C_5$ alkyl;

with meglumine.

9. The pharmaceutically acceptable salt according to claim 8, wherein:

$R_1$ and $R_2$ are both in position 3 or both in position 5 of the aromatic ring and, simultaneously with H;

$R_3$ is an aryl substituted with a COOH group in position 4 of the aromatic ring, said iron complex being an iron complex according to the following formula:

(Ia)

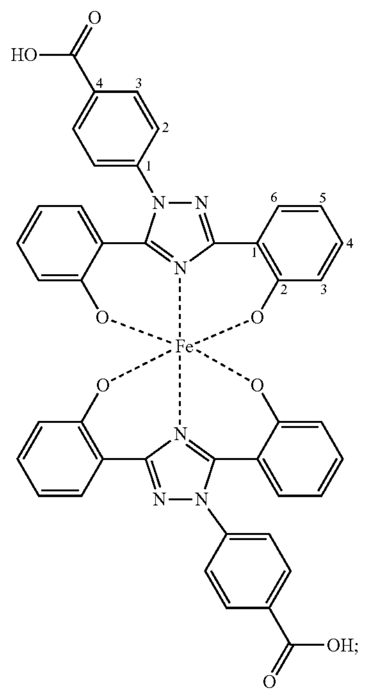

with meglumine.

10. A method for in situ preparation of a pharmaceutical composition according to claim 1, comprising the step of mixing:

(i) a compound having the general formula (II):

(II)

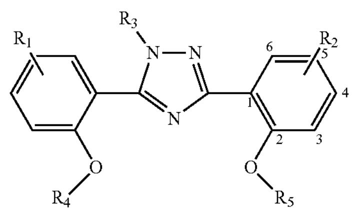

wherein:

$R_1$ and $R_2$ are both in position 3 or both in position 5 of the aromatic ring and, simultaneously with or independently of each other, they are selected from: H, halogen, $C_1$-$C_5$ alkyl, $C_1$-$C_5$alkoxyl;

$R_3$ is selected from: H, $C_1$-$C_5$ alkyl, $C_1$-$C_5$ hydroxyalkyl, $C_1$-$C_5$ carboxyalkyl, aryl possibly substituted with at least one group selected from: COOH, halogen, $C_1$-$C_8$alkyl, $C_1$-$C_5$ alkoxyl, OH, $NZ_2$, $CONZ_2$, wherein Z is simultaneously or independently selected from: H, $C_1$-$C_5$ alkyl;

$R_4$ and $R_5$, simultaneously with or independently of each other, are selected from: H, $C_1$-$C_4$ alkanoyl or aroyl possibly substituted with at least one group selected from: COOH, $C_1$-$C_2$ alkyl, $C_1$-$C_2$ alkoxyl, OH;

with (ii) an inorganic or organic base selected from the group consisting of: a salt of an alkali metal or alkaline earth metal, an amine, an amino alcohol, until forming a pharmaceutically acceptable salt of the compound having the general formula (II), and subsequently mixing with an iron compound capable of providing Fe(III) ions, until forming a pharmaceutically acceptable salt of the iron complex having the general formula (I); and (iii) mixing the pharmaceutically acceptable salt of the iron complex having the general formula (I) with one or more excipients, diluents and/or pharmaceutically acceptable media.

11. A method for in situ preparation of a pharmaceutically acceptable salt according to claim 8, comprising the step of mixing:

(i) a compound having the general formula (II)

(II)

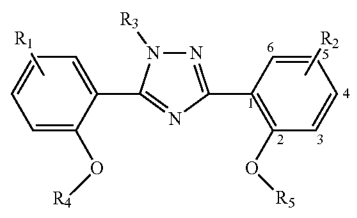

wherein:

$R_1$ and $R_2$ are both in position 3 or both in position 5 of the aromatic ring and, simultaneously with or independently of each other, they are selected from: H, halogen, $C_1$-$C_5$ alkyl, $C_1$-$C_5$ alkoxyl;

$R_3$ is selected from: H, $C_1$-$C_5$ alkyl, $C_1$-$C_5$ hydroxyalkyl, $C_1$-$C_5$ carboxyalkyl, aryl possibly substituted with at least one group selected from: COOH, halogen, $C_1$-$C_5$ alkyl, $C_1$-$C_5$ alkoxyl, OH, $NZ_2$, $CONZ_2$, wherein Z is simultaneously or independently selected from: H, $C_1$-$C_5$ alkyl;

$R_4$ and $R_5$, simultaneously with or independently of each other, are selected from: H, $C_1$-$C_4$ alkanoyl or aroyl possibly substituted with at least one group selected from: COOH, $C_1$-$C_2$ alkyl, $C_1$-$C_2$ alkoxyl, OH;

with (ii) N-methylglucamine (meglumine), until forming a pharmaceutically acceptable salt of the compound having the general formula (II), and subsequently mixing with an iron compound capable of providing Fe(III) ions, until forming a pharmaceutically acceptable salt of the iron complex having the general formula (I).

12. The method according to claim 11 for in situ preparation of a pharmaceutically acceptable salt, wherein $R_1$ and $R_2$ are both in position 3 or both in position 5 and are simultaneously with H; and $R_3$ is an aryl substituted with a COOH group in position 4 of the aromatic ring.

13. A kit for in situ preparation of a pharmaceutically acceptable salt of an iron complex having the general formula (I):

(I)

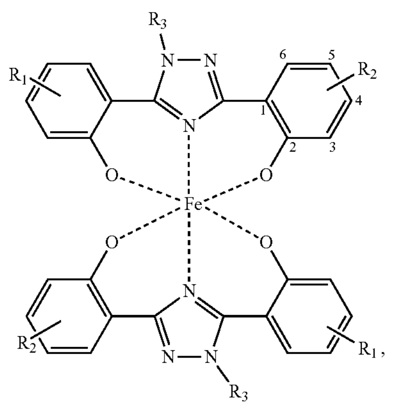

wherein:

$R_1$ and $R_2$ are both in position 3 or both in position 5 of the aromatic ring and, simultaneously with or independently of each other, they are selected from: H, halogen, $C_1$-$C_5$ alkyl, $C_1$-$C_5$ alkoxyl;

and $R_3$ is selected from: H, $C_1$-$C_5$ alkyl, $C_1$-$C_5$ hydroxyalkyl, $C_1$-$C_5$ carboxyalkyl, aryl possibly substituted with at least one group selected from: COOH, halogen, $C_1$-$C_5$ alkyl, $C_1$-$C_5$ alkoxyl, OH, $NZ_2$, $CONZ_2$, wherein Z is simultaneously or independently selected from: H, $C_1$-$C_5$ alkyl, said kit comprising at least three separate containers, wherein;

(i) a first container comprises a compound having the general formula (II):

(II)

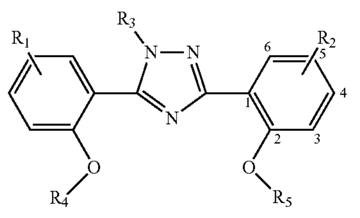

wherein:

$R_1$ and $R_2$ are both in position 3 or both in position 5 of the aromatic ring and, simultaneously with or independently of each other, they are selected from: H, halogen, $C_1$-$C_5$ alkyl, $C_1$-$C_5$ alkoxyl;

$R_3$ is selected from: H, $C_1$-$C_5$ alkyl, $C_1$-$C_5$ hydroxyalkyl, $C_1$-$C_5$ carboxyalkyl, aryl possibly substituted with at least one group selected from: COOH, halogen, $C_1$-$C_5$ alkyl, $C_1$-$C_5$ alkoxyl, OH, $NZ_2$, $CONZ_2$, wherein Z is simultaneously or independently selected from: H, $C_1$-$C_5$ alkyl;

$R_4$ and $R_5$, simultaneously with or independently of each other, are selected from: H, $C_1$-$C_4$ alkanoyl or aroyl possibly substituted with at least one group selected from: COOH, $C_1$-$C_2$ alkyl, $C_1$-$C_2$ alkoxyl, OH;

(ii) a second container comprises an iron compound capable of providing Fe(III) ions; and (iii) a third container comprises an inorganic or organic base.

14. The kit according to claim 13, comprising one or more excipients, diluents and/or pharmaceutically acceptable media, said one or more excipients, diluents and/or pharmaceutically acceptable media being contained in at least one of the three separate containers (i)-(iii).

15. The pharmaceutical composition according to claim 1, wherein said at least one group is in position 4 of the aromatic ring of said aryl.

16. The pharmaceutical composition according to claim 4, wherein $R_3$ is an aryl substituted with a group selected from: COOH, halogen, $C_1$-$C_3$ alkyl, $C_1$-$C_3$ alkoxyl, OH, $NZ_2$, $CONZ_2$, wherein Z is simultaneously or independently selected from: H, $C_1$-$C_2$ alkyl; said group being in position 4 of the aromatic ring of said aryl.

17. The pharmaceutical composition according to claim 1, wherein said amino alcohol is selected from the group consisting of: tris(hydroxymethyl)aminomethane, glucosamine, glucamine, and N-methylglucamine (meglumine).

18. The pharmaceutically acceptable salt according to claim 8, wherein said at least one group is in position 4 of the aromatic ring of said aryl.

19. A method for diagnostic imaging of a patient, comprising:

parenterally administering the pharmaceutical composition according to claim 1 to the patient; and obtaining an image of the patient using Magnetic Resonance Imaging (MRI).

20. The method according to claim 19, wherein the pharmaceutical composition is administered intravenously to the patient.

* * * * *